(12) United States Patent
Cho et al.

(10) Patent No.: US 7,903,306 B2
(45) Date of Patent: Mar. 8, 2011

(54) SENSOR IMAGE ENCODING AND/OR DECODING SYSTEM, MEDIUM, AND METHOD

(75) Inventors: Daesung Cho, Seoul (KR); Hyun Mun Kim, Seongnam-si (KR); Wooshik Kim, Yongin-si (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1231 days.

(21) Appl. No.: 11/490,020

(22) Filed: Jul. 21, 2006

(65) Prior Publication Data

US 2007/0171490 A1 Jul. 26, 2007

(30) Foreign Application Priority Data

Jul. 22, 2005 (KR) ........................ 10-2005-0066991

(51) Int. Cl.
*H04N 1/46* (2006.01)
(52) U.S. Cl. ......... 358/539; 358/505; 358/474; 358/518; 382/166; 382/167; 375/240.13; 375/240.16
(58) Field of Classification Search .................. 358/539, 358/505, 515, 516, 518, 520, 525; 382/166, 382/167, 300, 232; 375/240.13, 240.16, 375/E7.104, E7.243
See application file for complete search history.

(56) References Cited

U.S. PATENT DOCUMENTS

| | | | | |
|---|---|---|---|---|
| 5,623,423 A * | 4/1997 | Lipovski | ....................... | 708/203 |
| 5,798,792 A * | 8/1998 | Kusaka et al. | ................ | 348/264 |
| 6,026,232 A * | 2/2000 | Yogeshwar et al. | .......... | 715/719 |
| 6,195,390 B1 * | 2/2001 | Hashino et al. | .......... | 375/240.21 |
| 6,212,234 B1 * | 4/2001 | Andoh et al. | ............. | 375/240.08 |
| 6,246,396 B1 * | 6/2001 | Gibson et al. | .................. | 345/604 |
| 6,895,052 B2 * | 5/2005 | Hanamura et al. | ....... | 375/240.03 |
| 7,324,594 B2 * | 1/2008 | Lamboray et al. | ....... | 375/240.03 |
| 7,535,961 B2 * | 5/2009 | Cho et al. | .................. | 375/240.12 |
| 2001/0019630 A1 * | 9/2001 | Johnson | ........................... | 382/232 |
| 2002/0054638 A1 * | 5/2002 | Hanamura et al. | ....... | 375/240.03 |
| 2003/0103562 A1 * | 6/2003 | Sugiyama | ................ | 375/240.01 |
| 2004/0091158 A1 * | 5/2004 | Miled et al. | ................... | 382/236 |
| 2005/0013363 A1 * | 1/2005 | Cho et al. | ................. | 375/240.12 |
| 2005/0094007 A1 * | 5/2005 | Nomura et al. | ............... | 348/272 |
| 2005/0249404 A1 * | 11/2005 | Xiaomang | .................... | 382/162 |
| 2006/0210155 A1 * | 9/2006 | Sun | .............................. | 382/166 |
| 2006/0210156 A1 * | 9/2006 | Lei et al. | ....................... | 382/166 |
| 2007/0053431 A1 * | 3/2007 | Cammas et al. | .......... | 375/240.12 |
| 2007/0064795 A1 * | 3/2007 | Cho et al. | ................. | 375/240.03 |
| 2007/0110153 A1 * | 5/2007 | Cho et al. | ................. | 375/240.12 |
| 2007/0171985 A1 * | 7/2007 | Kim et al. | ................. | 375/240.26 |

* cited by examiner

*Primary Examiner* — Negussie Worku
(74) *Attorney, Agent, or Firm* — Staas & Halsey LLP

(57) ABSTRACT

Sensor image encoding and/or decoding systems, media, and methods. The sensor image encoding system may include a first color component interpolation unit transforming a sensor image into a first format image by interpolating a first color component of at least two color components in the sensor image including the at least two color components, in which one pixel has one color component, and an encoding unit generating a bitstream by encoding the first format image. The sensor image decoding system may include a decoding unit receiving a bitstream obtained by encoding a sensor image including the at least two color components, where one pixel has one color component, and restoring a first format image by using at least two color components obtained by decoding the bitstream, and a first color component interpolation unit interpolating at least one color component in the first format image provided from the decoding unit.

67 Claims, 24 Drawing Sheets

SENSOR IMAGE ENCODING AND/OR DECODING SYSTEM, MEDIUM, AND METHOD

CROSS-REFERENCE TO RELATED APPLICATIONS

This application claims the benefit of Korean Patent Application No. 10-2005-0066991, filed on Jul. 22, 2005, in the Korean Intellectual Property Office, the disclosure of which is incorporated herein in its entirety by reference.

BACKGROUND OF THE INVENTION

1. Field of the Invention

Embodiments of the present invention relate to image encoding and/or decoding, and more particularly, to a system, medium, and method efficiently encoding and/or decoding a sensor image.

2. Description of the Related Art

In general, mobile devices, such as digital cameras, use one charge-coupled device (CCD) plate as an image capture device. When an image input through one CCD plate is encoded and decoded, first, a color component that is absent in relation to each pixel is obtained through interpolation and then, color transform from an RGB image into a YUV image is performed. At this time, in addition to the occurrence of redundant data in the interpolation process, a rounding error can occur in the color transform process. In order to reduce the redundant data and improve the compression ratio, there has been an attempt to implement a processing of a 4:2:0 format YUV image that is generated by sampling the chromaticity components (U, V) of a YUV image into a ¼ size. However, in this case, the characteristic of an image provided from a sensor, such as a CCD plate, cannot be reflected correctly, resulting in the picture quality of a restored image being degraded.

Meanwhile, in order to enable encoding and/or decoding of a high quality picture by reducing the rounding error occurring in the color transform process, an RGB image may be directly processed without the color transform process. However, in this case, only a 4:4:4 format RGB image is processed, compared to the above 4:2:0 format YUV image, which results in the bit rate increasing and the amount of data to be processed increasing relatively. As a result, complexity increases due to increases in the capacity and bandwidth of memory, resulting in such a directly processing of the RGB image without the color transform process not being suitable for mobile devices.

Leading examples of the conventional technologies applied to image encoding and decoding as described above include ISO/IEC MPEG-4 video encoding international standard ("Text of ISO/IEC FDIS 14496-2: Information Technology—Generic coding of audio-visual objects—Part 2: Visual) and H.264/MPEG-4 pt.10 AVC standardization technology ("Text of ISO/IEC FDIS 14496-10: Information Technology—Coding of audio-visual objects—Part 10: Advanced Video Coding", ISO/IEC JTC 1/SC 29/WG 11, N5555, March, 2003) of Joint Video Team (JVT) of ISO/IEC MPEG and ITU-T VCEG.

SUMMARY OF THE INVENTION

Embodiments of the present invention provide a system, medium, and method generating a 4:2:0 format RGB image from a sensor image, and encoding and/or decoding the 4:2:0 format RGB image.

Embodiments of the present invention provide a system, medium, and method directly encoding and/or decoding a sensor image.

Embodiments of the present invention provide a system, medium, and method generating a 4:2:0 format RGB image from a sensor image, and encoding and/or decoding the 4:2:0 format RGB image by considering position information and R and B components.

Embodiments of the present invention provide a system, medium, and method directly encoding and/or decoding a sensor image by considering color pattern information and R, G, and B components.

Additional aspects and/or advantages of the invention will be set forth in part in the description which follows and, in part, will be apparent from the description, or may be learned by practice of the invention.

To achieve the above and/or other aspects and advantages, embodiments of the present invention include a sensor image encoding system, including a first color component interpolation unit to transform a sensor image into a first format image by interpolating a first color component of at least two color components in the sensor image, including the at least two color components, wherein one pixel of the sensor image represents only a single color component, and an output unit to output the first format image.

The first format image may be a 4:2:0 format RGB image.

In addition, the output unit may be an encoding unit that generates a bitstream by encoding the first format image.

Here, the encoding unit may further include a color component sampling unit to sample the first color component of the first format image such that a resultant sampled first color component and at least one of the at least two color components have identical resolutions, and a color component encoding unit to generate the bitstream by encoding the at least one of the at least two color components and the sampled first color component.

The encoding unit may further including a second color component interpolation unit to interpolate an encoded first color component, encoded in the color component encoding unit, such that a resultant secondly interpreted first color component has a resolution identical to a resolution of the first color component in the sensor image, and a residue encoding unit to encode a residue component between the first color component of the first format image and the secondly interpreted first component, as provided by the second color component interpolation unit, and to add the encoded residue component to the bitstream.

The color component encoding unit may perform one of residue color transform and inter plane prediction (IPP) in order to remove redundancy between residue data of the at least two color components.

In addition, the system may include a position information generation unit to generate position information of a second color component in the sensor image, wherein the encoding unit generates the bitstream by encoding the at least two color components of the first format image by using the position information.

Here, the position information generation unit may generate the position information of the second color component based on motion information of the first color component and relative position information of the second color component with respect to the first color component.

Further, the encoding unit may encode a residue component between the first color component of the first format image and a restored first component, restored and interpolated from the bitstream, and adds the encoded residue component to the bitstream.

To achieve the above and/or other aspects and advantages, embodiments of the present invention include a sensor image decoding system to decode an encoded sensor image, the sensor image including at least two color components, in which one pixel of the sensor image represents only a single color component, the system including a decoding unit to restore a first format image of the encoded sensor image based on at least two color components obtained with the encoded sensor image, and a first color component interpolation unit to interpolate at least one color component in the first format image.

The first format image may be a 4:2:0 format RGB image.

In addition, the decoding unit may decode the encoded sensor image from a received bitstream and the at least two color components may be obtained by decoding the bitstream.

The decoding unit may further include a color component decoding unit to generate the first format image by restoring the at least two color components by decoding the bitstream, and a second color component interpolation unit to interpolate a first color component, as a secondly interpreted first color component, restored by the color component decoding unit.

In addition, the decoding unit may still further include a residue decoding unit to restore a residue component of the first color component by decoding the bitstream, and an addition unit to add the secondly interpreted first color component, as provided by the second color component interpolation unit, and the restored residue component.

The color component decoding unit may decodes the at least two color components by using one of residue color transform and inter plane prediction (IPP).

The system may further include a position information generation unit to generate position information of at least one color component from the bitstream, wherein the decoding unit and the first color component interpolation unit use the position information.

The position information generation unit may generate the position information of the at least one color component based on motion information of a first color component and relative position information of a second color component with respect to the first color component.

To achieve the above and/or other aspects and advantages, embodiments of the present invention include a sensor image encoding system, including an image input unit to input a sensor image having a predetermined pattern such that one pixel of the sensor image represents only a single color component, and an encoding unit to encode the sensor image by removing redundancy of each color component existing in the pattern in the sensor image through color space transform.

Here, the encoding unit may generate a bitstream by the encoding of the sensor image.

In addition, the pattern may be a repetitive pattern having an N×N size representing 4 color components of R, G, G, and B components.

Further, the encoding unit may perform encoding by arraying color space transformed data as a color plane with respect to the 4 color components.

When the pattern has a shape different from an N×N size, the sensor image may be treated as a luminance image and encoded.

In addition, the system may include a color pattern information generation unit to generate color pattern information of at least two color components of the sensor image, wherein the encoding unit uses the color pattern information.

To achieve the above and/or other aspects and advantages, embodiments of the present invention include a sensor image decoding system to decode an encoded sensor image, where the sensor image has a predetermined pattern such that one pixel of the sensor image represents only a single color component, the decoding system including a decoding unit to restore the encoded sensor image, as a restored sensor image, by decoding the encoded sensor image through inverse color space transform, and a color component interpolation unit to interpolate a corresponding color component absent in each pixel in the restored sensor image.

The decoding unit may receive a bitstream including the encoded sensor image and the encoded sensor image may be decoded by decoding the bitstream through the inverse color space transform.

Further, the system may include a color pattern information generation unit to generate color pattern information of at least two color components of the encoded sensor image by decoding the bitstream, wherein the decoding unit and the color component interpolation unit use the color pattern information.

The pattern may be a repetitive pattern having an N×N size representing 4 color components of R, G, G, and B components.

Further, the decoding unit may performs decoding by arraying inverse color space transformed data as a color plane with respect to the 4 color components.

In addition, when the pattern has a shape different from an N×N size, the encoded sensor image may be treated as a luminance image and decoded.

To achieve the above and/or other aspects and advantages, embodiments of the present invention include a sensor image encoding method, including transforming a sensor image into a first format image by interpolating a first color component of at least two color components in the sensor image, including the at least two color components, wherein one pixel of the sensor image represents only a single color component, and outputting the first format image.

Here, the first format image may be a 4:2:0 format RGB image.

Further, the method may include an encoding of a bitstream by encoding the output first format image.

Here, the generating of the bitstream may include sampling the first color component of the first format image such that a resultant sampled first color component and at least one of the at least two color components have identical resolutions, and generating the bitstream by encoding the at least one of the two color components and the sampled first color component having identical resolutions.

In addition, the generating of the bitstream may further include encoding a residue component between the first color component of the first format image and a restored and interpreted first component and adding the encoded residue component to the bitstream.

The residue may be encoded sequentially by a space transform process, a quantization process, and an entropy encoding process on the residue.

Further, the residue may be encoded sequentially by a spatiotemporal prediction process, a space transform process, a quantization process, and an entropy encoding process on the residue.

The method may further include generating position information of a second color component in the sensor image, wherein the bitstream is generated by encoding the at least two color components of the first format image by using the position information.

To achieve the above and/or other aspects and advantages, embodiments of the present invention include a sensor image decoding method decoding an encoded sensor image, the sensor image including at least two color components, in which one pixel of the sensor image represents only a single color component, the method including restoring a first format image of the encoded sensor image based on the at least two color components obtained by decoding the encoded sensor image, and interpolating at least one color component of the first format image.

Here, the first format image may be a 4:2:0 format RGB image.

The method may further include decoding the encoded sensor image from a received bitstream, where the at least two color components are obtained by decoding the bitstream.

In addition, the method may include generating position information of at least one color component from the bitstream, wherein the bitstream may be decoded by using the position information.

To achieve the above and/or other aspects and advantages, embodiments of the present invention include a sensor image encoding method, including inputting a sensor image having a predetermined pattern such that one pixel of the sensor image represents only a single color component, and encoding the sensor image by removing redundancy of each color component existing in the pattern in the sensor image through color space transform.

The encoding of the sensor image may further include generating a bitstream by the encoding of the sensor image.

In addition, the pattern may be a repetitive pattern having an N×N size representing 4 color components of R, G, G, and B components.

The encoding may further include arraying color space transformed data as a color plane with respect to the 4 color components.

Still further, when the pattern has a shape different from an N×N size, the sensor image may be treated as a luminance image and encoded.

The method may further include generating color pattern information of at least two color components of the sensor image, wherein the bitstream may be generated based on the color pattern information.

To achieve the above and/or other aspects and advantages, embodiments of the present invention include a sensor image decoding method decoding an encoded sensor image, where the sensor image has a predetermined pattern such that one pixel of the sensor image represents only a single color component, the decoding method including restoring the encoded sensor image by decoding the encoded sensor image through inverse color space transform, and interpolating a corresponding color component absent in each pixel in the restored sensor image.

The method may further include receiving a bitstream including the encoded sensor image, and decoding the bitstream through the inverse color space transform to generate the restored sensor image.

Here, the method may still further include generating color pattern information of at least two color components of the encoded sensor image by decoding the bitstream, wherein the bitstream may be decoded based on the color pattern information.

The pattern may be a repetitive pattern having an N×N size representing 4 color components of R, G, G, and B components.

In addition, the encoded sensor image may be decoded by arraying inverse color space transformed data as a color plane with respect to the 4 color components.

Further, when the pattern has a shape different from an N×N size, the encoded sensor image may be treated as a luminance image and decoded.

To achieve the above and/or other aspects and advantages, embodiments of the present invention include at least one medium including computer readable code to implement embodiments of the present invention.

To achieve the above and/or other aspects and advantages, embodiments of the present invention include a sensor image decoding system to decode an encoded sensor image, as encoded by an encoding embodiment of the present invention, with the sensor image including at least two color components, in which one pixel of the sensor image represents only a single color component, the decoding system including a decoding unit to restore a first format image of the encoded sensor image based on at least two color components obtained with the encoded sensor image, and a first color component interpolation unit to interpolate at least one color component in the first format image.

To achieve the above and/or other aspects and advantages, embodiments of the present invention include a sensor image decoding system to decode an encoded sensor image, as encoded by an encoding embodiment of the present invention, the decoding system including a decoding unit to restore the encoded sensor image, as a restored sensor image, by decoding the encoded sensor image through inverse color space transform, and a color component interpolation unit to interpolate a color component absent in each pixel in the restored sensor image.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 25A through 25C illustrate other types of sensor images, according to an embodiment of the present invention;

DETAILED DESCRIPTION OF THE PREFERRED EMBODIMENTS

Figure 1:
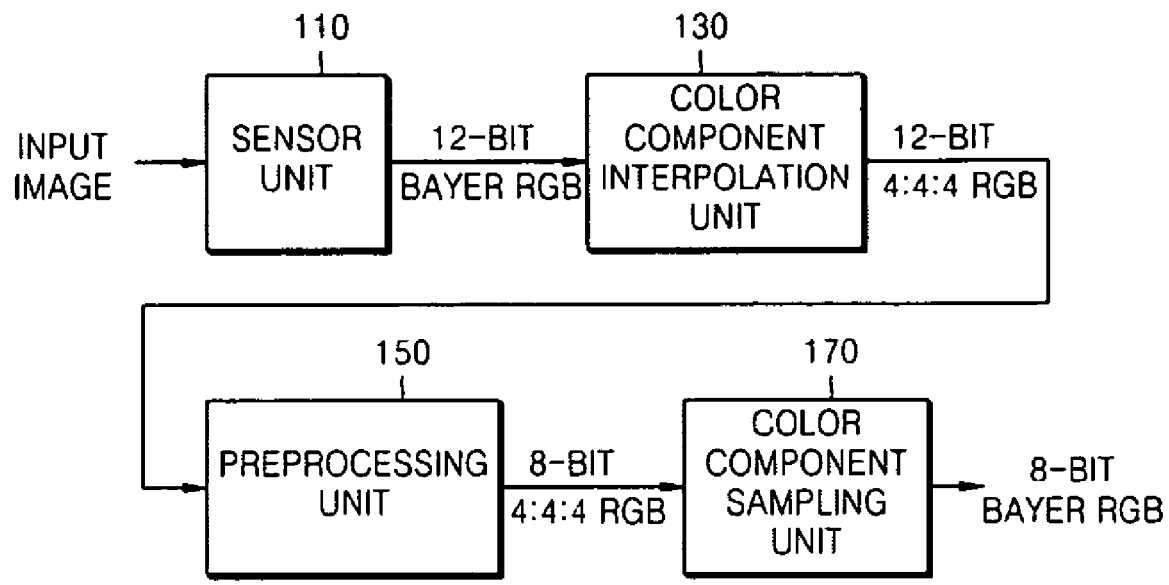
FIG. 1 illustrates an image capture system to obtain a sensor image used as an input of a sensor image encoding system, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates an image capture system obtaining a sensor image for input of the sensor image encoding system, according to an embodiment of the present invention. The image capture system may be embedded in a mobile device, such as a digital camera, for example, noting that alternative embodiments are equally available.

Figure 2:
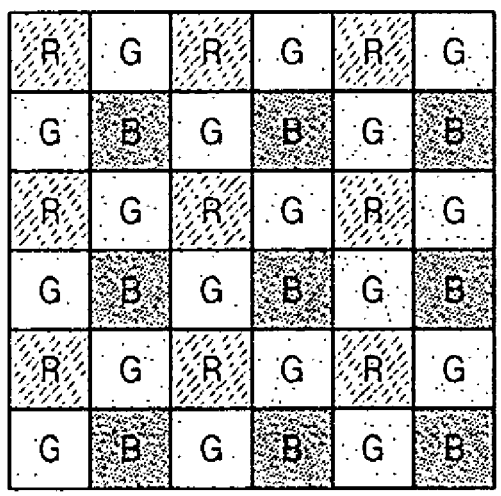
FIG. 2 illustrates a pattern of a Bayer color filter array used in a sensor unit, such as that of FIG. 1, according to an embodiment of the present invention.

Referring to FIG. 1, a sensor unit 110 may be used to capture an RGB image. At this time each pixel of the sensor unit 110 extracts a pixel value of any one color component of R, G, and B components, such that each pixel only represents one color component. If the sensor unit 110 is implemented as one CCD plate, such as a Bayer color filter array (CFA) that has been generally widely used, a first sensor image having a repetitive pattern of a 2×2 size, as illustrated in FIG. 2, may be generated. As one example of the first sensor image, a 12-bit Bayer format RGB image may be employed, noting that alternative embodiments are equally available.

In a color component interpolation unit 130, such a 12-bit Bayer format RGB image provided by the sensor unit 110 may be input and interpolation may be performed for color components that are absent for each pixel using adjacent pixel values so that each pixel has all of R, G, and B, for example, components. As a result, a 12-bit 4:4:4 format RGB image may be generated.

In a preprocessing unit 150, a 12-bit 4:4:4 format RGB image, such as that provided through the color component interpolation unit 130, may be input and a preprocessing process, including color correction, white balancing, and gamma correction, may be performed to generate an 8-bit 4:4:4 format RGB image, for example.

In a color component sampling unit 170, a color component sampling process of an 8-bit 4:4:4 format RGB image, for example, such as that provided by the preprocessing unit 150, may be performed and a second sensor image generated. Here, the 12-bit Bayer format RGB image is used as only one example of the first sensor image, and the 8-bit Bayer format RGB image is also employed as only one example of the second sensor image, noting that alternative embodiments are equally available.

Figure 3:
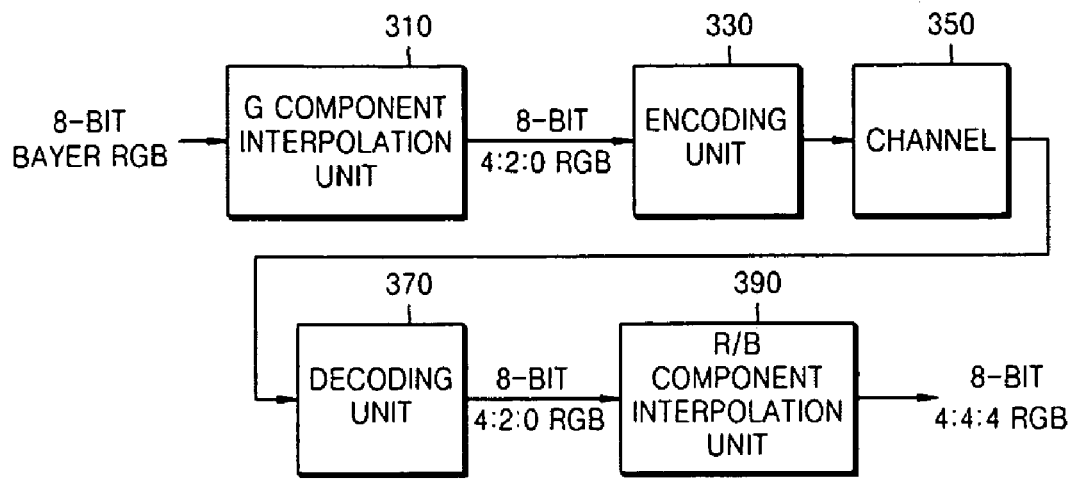
FIG. 3 illustrates a sensor image encoding system and/or a sensor image decoding system, according to an embodiment of the present invention.

FIG. 3 illustrates a sensor image encoding system and/or a sensor image decoding system, according to an embodiment of the present invention. The sensor image encoding system may include a G component interpolation unit 310 and an encoding unit 330, for example, and the sensor image decoding system may include a decoding unit 370 and an R/B component interpolation unit 390, for example. Here, the G component interpolation unit 310 and the R/B component interpolation unit 390 may be varied into an R component interpolation unit and a G/B component interpolation unit, or a B component interpolation unit and an R/G component interpolation unit, etc., for example, depending on the filter array used to obtain the sensor image. For simplicity of explanation, herein just the G component interpolation unit 310 and the R/B component interpolation unit 390 will be explained. Here, the sensor image encoding system and/or the sensor image decoding system may also be integrally included in a single device of a server side and/or a client side, for example.

Referring to FIG. 3, in the G component interpolation unit 310, a sensor image may be input, e.g., such as an 8-bit Bayer format RGB image provided by the image capture system of FIG. 1, and a G component may be interpolated for each pixel so that an 8-bit 4:2:0 format RGB image, which is actually a GRB image, is generated. For the G component interpolation, a variety of conventional algorithms, such as a nonadaptive algorithm or an adaptive algorithm, can be used. For example, the nonadaptive algorithm may include nearest neighbor replication, bilinear interpolation, media interpolation, and gradual chromatic change interpolation, for example, and the adaptive algorithm may include a pattern matching based interpolation algorithm, interpolation using a threshold-based variable number of gradients, and edge sensing interpolation, for example.

In the encoding unit 330, an 8-bit 4:2:0 format RGB image provided by the G component interpolation unit 310 may be compressed to generate a bitstream and the generated bitstream may be provided to the decoding unit 370 through a channel 350. Here, the channel 350 may be omitted or may be replaced by a storage medium, such as a universal serial bus (USB) memory, in one embodiment of the present invention.

In the decoding unit 370, a bitstream transmitted through the channel 350, for example, may be decoded to restore an 8-bit 4:2:0 format RGB image.

In the R/B component interpolation unit 390, the remaining R and B components for each pixel in the 8-bit 4:2:0 format RGB image, provided from the decoding unit 370, may be interpolated so that an 8-bit 4:4:4 format RGB image is generated. The generated 8-bit 4:4:4 format RGB image may then be output to an image display system (not shown), for example.

Figure 4:
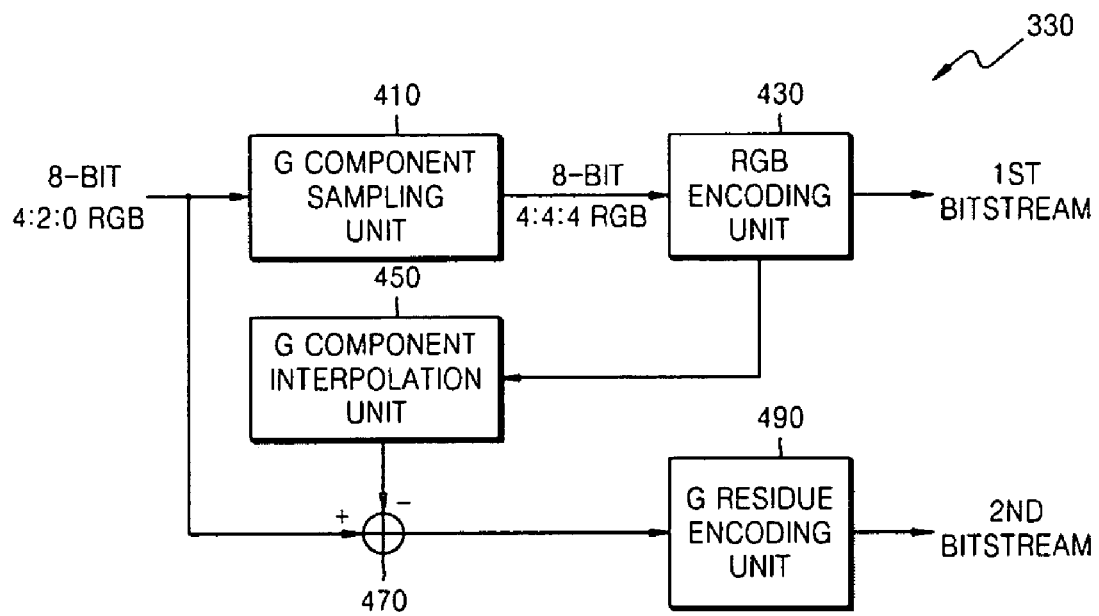
FIG. 4 illustrates an encoding unit, such as that illustrated in FIG. 3, according to an embodiment of the present invention.

FIG. 4 illustrates an encoding unit 330, such as that illustrated in FIG. 3, according to an embodiment of the present invention. The encoding unit 330 may include a G component sampling unit 410, an RGB encoding unit 430, a G component interpolation unit 450, a subtraction unit 470, and a G residue encoding unit 490, for example. Here, the G component interpolation unit 450, the subtraction unit 470, and the G residue encoding unit 490 may be optionally included, for example.

Referring to FIG. 4, in the G component sampling unit 410, a G component in a 4:2:0 format RGB image may be sampled into a ¼ size so that the resolution of the G component is the same as those of the R and B components.

In an embodiment, in the RGB encoding unit 430, the R, G and B component having identical resolutions and provided from the G component sampling unit 410 may be encoded so that a first bitstream is generated.

In the G component interpolation unit 450, the G component encoded in the RGB encoding unit 430 is restored and interpolation of the restored G component is performed so that the size of the G component is quadrupled.

In the subtraction unit 470, the G component difference is obtained between the G component of a 4:2:0 format RGB image, e.g., provided from the encoding unit 330, and the interpolated G component provided by the G component interpolation unit 450 and output as a G residue component. The G residue component is used to improve the restoration performance of a G component that has the largest influence on the picture quality of a sensor image decoding system.

In the G residue encoding unit 490, a G residue component provided by the subtraction unit 470 is encoded so that a second bitstream is generated.

Figure 5:
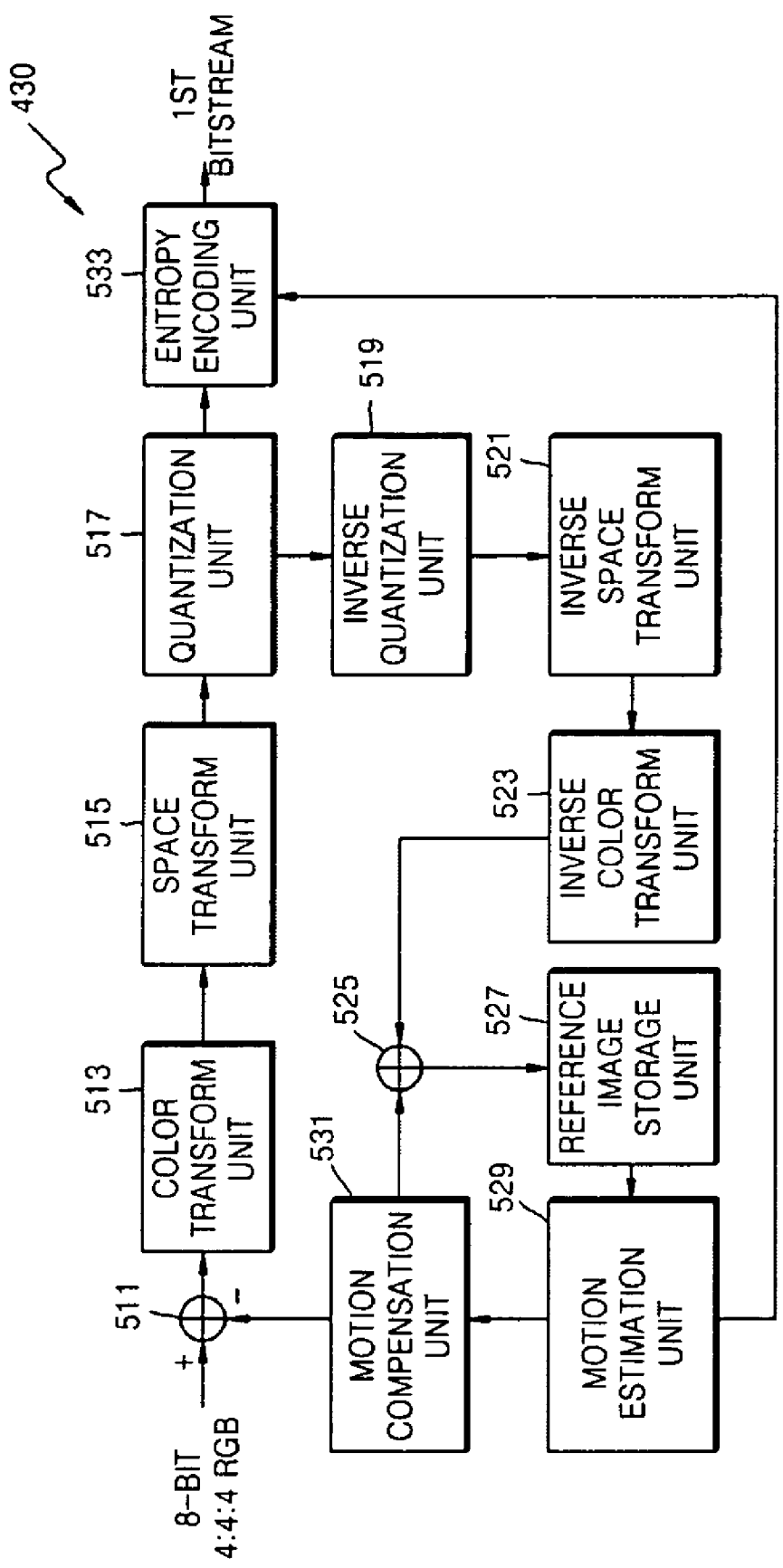
FIG. 5 illustrates an RGB encoding unit, such as that illustrated in FIG. 4, according to an embodiment of the present invention.

FIG. 5 illustrates an RGB encoding unit 430, such as that illustrated in FIG. 4, according to an embodiment of the present invention. The RGB encoding unit 430 may include a subtraction unit 511, a color transform unit 513, a space transform unit 515, a quantization unit 517, an inverse quantization unit 519, an inverse space transform unit 521, an inverse color transform unit 523, an addition unit 525, a reference image storage unit 527, a motion estimation unit 529, a motion compensation unit 531, and an entropy encoding unit 533, for example. Here, the RGB encoding unit 430 may employ an encoding method such as that discussed in ISO/IEC MPEG-4 video encoding international standard, or H.264/MPEG-4 pt.10 AVC standardization technology of JVT of ISO/IEC MPEG and ITU-T VCEG, but is not limited thereto. Here, an explanation of detailed operations of similar elements with the encoding method will be omitted and elements being different, e.g., the color transform unit 513 and the inverse color transform unit 523, will be explained in greater detail.

In relation to a residue color component, e.g., obtained from the subtraction unit 511, after motion estimation, such as spatiotemporal estimation, and compensation are performed, the color transform unit 513 and the inverse color transform unit 523 perform residue color transform (RCT) and inverse residual color transform (IRCT), respectively, so that redundancy of color components, which is a drawback of an RGB image, can be reduced and the efficiency of encoding can be improved.

The color transform and inverse color transform in the RCT and IRCT may be expressed as the following Equations 1 and 2, respectively, as only examples.

$$\Delta^2 B = \Delta R - \Delta B,$$

$$t = \Delta B + (\Delta^2 B >> 1),$$

$$\Delta^2 R = \Delta G - t,$$

$$\Delta^2 G = t + (\Delta^2 G >> 1) \qquad \text{Equation 1:}$$

$$t = \Delta^2 G' - (\Delta^2 R' >> 1),$$

$$\Delta G' = \Delta^2 R' + t,$$

$$\Delta R' = t - (\Delta^2 B' >> 1),$$

$$\Delta R' = \Delta B' + \Delta^2 B' \qquad \text{Equation 2:}$$

Here, ΔX (X is R, G or B) and ΔX' represent the residue after motion estimation and the residue after compression and restoration, respectively. Δ²X and Δ²X' represent the value after RCT and the value after RCT and restoration, respectively. Meanwhile, ">>" is a shift-right operation and t is a temporary variable to store a value during calculation.

Alternatively, instead of the equations 1 and 2, the color transform unit 513 and the inverse color transform unit 523 may perform color transform and inverse color transform through inter plane prediction (IPP), defined in the following Equations 3 and 4, respectively, for example.

$$\Delta^2 G = \Delta G'$$

$$\Delta^2 R = \Delta R - \Delta G'$$

$$\Delta^2 B = \Delta B - \Delta G' \qquad \text{Equation 3:}$$

$$\Delta G' = \Delta^2 G'$$

$$\Delta R' = \Delta^2 R' + \Delta G'$$

$$\Delta B = \Delta^2 B' + \Delta G' \qquad \text{Equation 4:}$$

Figure 6A:
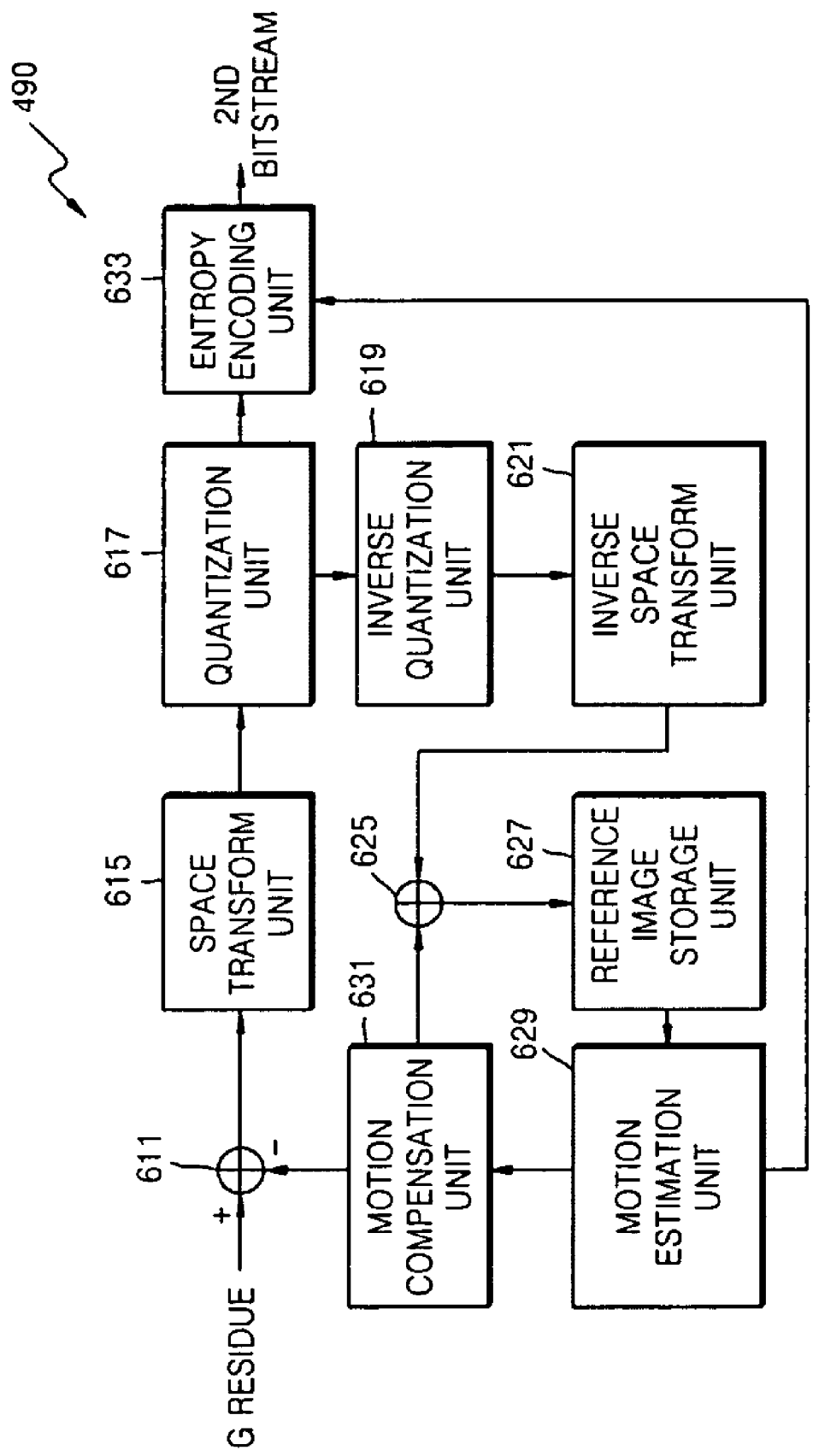
FIGS. 6A and 6B illustrate a G residue encoding unit, such as that illustrated in FIG. 4, according to an embodiment of the present invention.
Figure 6B:
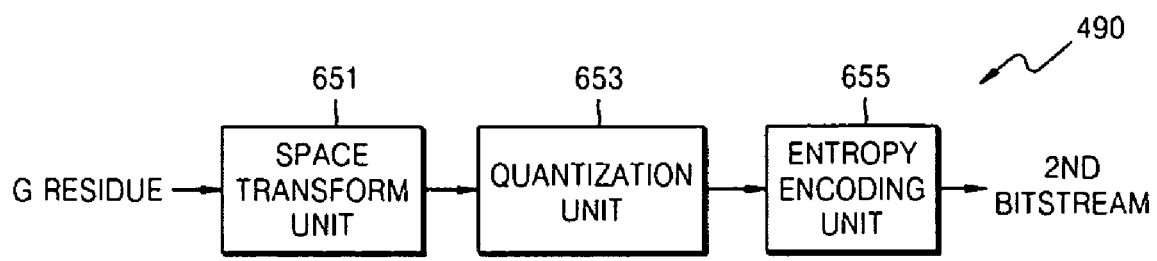

FIGS. 6A and 6B illustrate a G residue encoding unit 490, such as that illustrated in FIG. 4, according to embodiments of the present invention.

The G residue encoding unit 490 illustrated in FIG. 6A employs an encoding method using spatiotemporal estimation between residue data and includes a subtraction unit 611, a space transform unit 615, a quantization unit 617, an inverse quantization unit 619, an inverse space transform unit 621, an addition unit 625, a reference image storage unit 627, a motion estimation unit 629, a motion compensation unit 631, and an entropy encoding unit 633, for example. The G residue encoding unit 490 illustrated in FIG. 6A may improve the performance of the encoding by using estimation between residue data adjacent in space and time as well as removing redundancy between residue color components. Likewise, ISO/IEC MPEG-4 video encoding international standard, or H.264/MPEG-4 pt.10 AVC standardization technology of JVT of ISO/IEC MPEG and ITU-T VCEG may also be employed.

This will now be explained briefly. In an inter prediction mode, the motion estimation unit 629 extracts a block similar to a block that is currently desired to be encoded, from a previous image restored in the motion compensation unit 631, for example, and then, performs temporal estimation by encoding the difference between an extracted block pixel value of the previous image and the block pixel value of a current image.

Meanwhile, in an intra prediction mode, the motion estimation unit 629 extracts a block similar to a block that is currently desired to be encoded, in a current restored image, and then, performs spatial estimation by encoding the difference between an extracted block pixel value and a current block pixel value.

In relation to the data in which spatiotemporal estimation is performed, the space transform unit 615 may perform frequency space transform, such as a discrete cosine transform (DCT), Hadamard transform or integer transform, as only an example.

In the quantization unit 617, transform coefficients provided from the space transform unit 615 may be quantized and quantization coefficients output.

The entropy encoding unit 633 may then generate a bitstream by entropy encoding quantization coefficients, and motion vectors and additional information output from the motion estimation unit 629.

Meanwhile, the G residue encoding unit 490 illustrated in FIG. 6B may include a space transform unit 651, a quantization unit 653, and an entropy encoding unit 655, for example. The space transform unit 651 performs frequency space transform of a G residue component, by using DCT or integer transform, for example. The quantization unit 653 quantizes transform coefficients provided from the space transform unit 651, and the entropy encoding unit 655 entropy-encodes the transform coefficients quantized in the quantization unit 653. The G residue encoding unit 490 illustrated in FIG. 6B may be easier to implement than the G residue encoding unit 490 illustrated in FIG. 6A.

Figure 7:
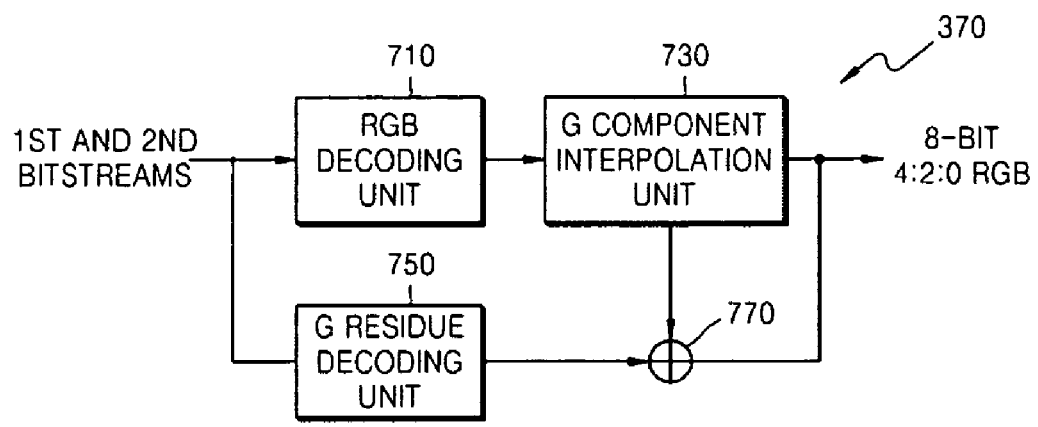
FIG. 7 illustrates a decoding unit, such as that illustrated in FIG. 3, according to an embodiment of the present invention.

FIG. 7 illustrates a decoding unit 370, such as that illustrated in FIG. 3, according to an embodiment of the present invention. The decoding unit 370 may include an RGB decoding unit 710, a G component interpolation unit 730, a G residue decoding unit 750, and an addition unit 770. The decoding unit 370 may perform an inverse process to the encoding unit 330 of FIG. 4 such that a 4:2:0 format RGB image is restored from a bitstream. Here, the G residue decoding unit 750 and the addition unit 770 may be optionally included, for example.

Referring to FIG. 7, in the RGB decoding unit 710, a bitstream obtained by encoding a sensor image may be decoded such that R, G and B components are restored.

In the G component interpolation unit 730, interpolation of a restored G component, e.g., provided from the RGB decoding unit 710, may be performed such that a 4:2:0 format RGB image is restored.

In the G residue decoding unit 750, a bitstream obtained by encoding a sensor image, for example, is decoded to restore a G residue component.

In the addition unit 770, an interpolated and restored G component may be added to a restored G residue component, and the added result may be added to the 4:2:0 format RGB image to improve the restoration performance.

Figure 8:
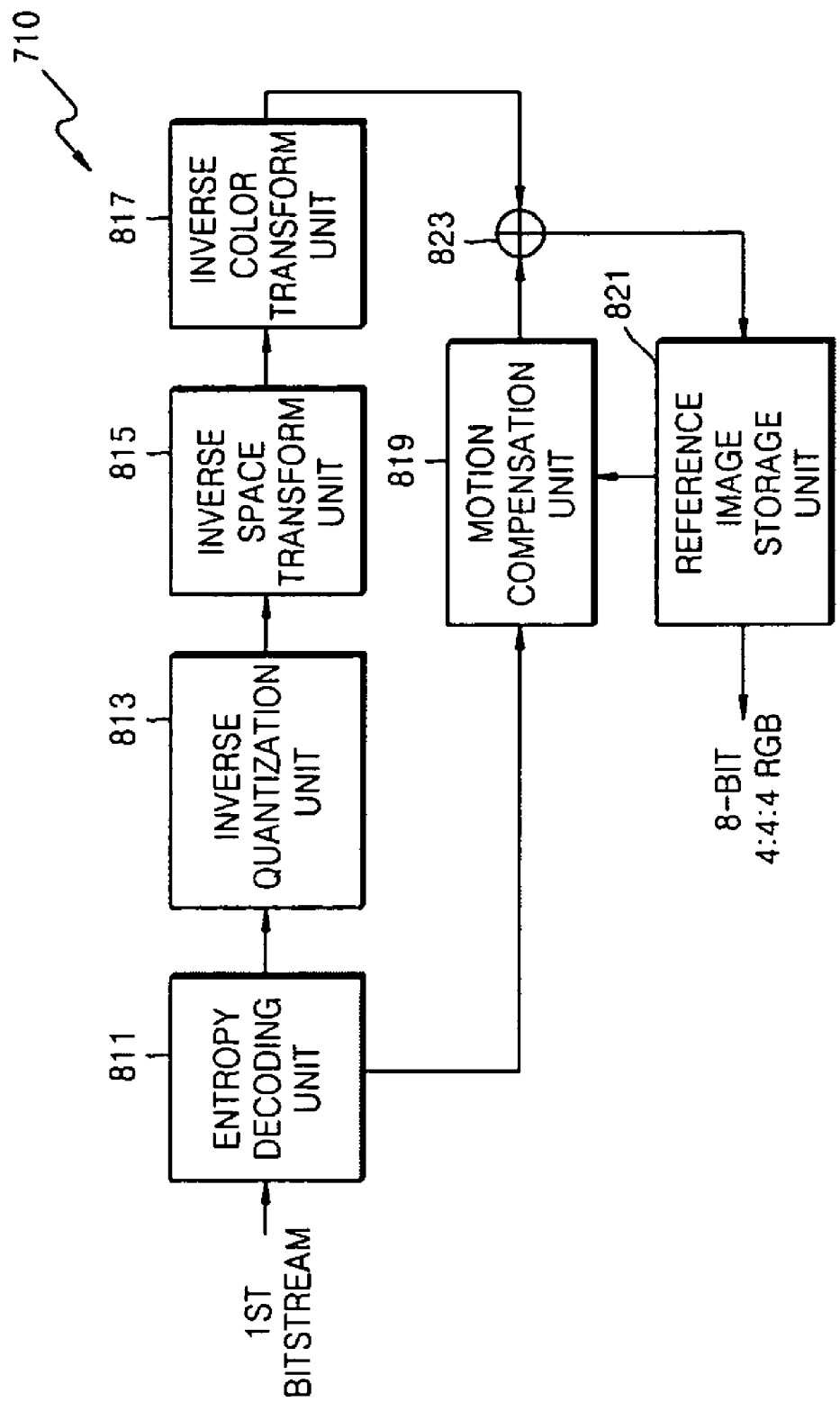
FIG. 8 illustrates an RGB decoding unit, such as that illustrated in FIG. 7, according to an embodiment of the present invention.

FIG. 8 illustrates an RGB decoding unit 710, such as that illustrated in FIG. 7, according to an embodiment of the present invention. The RGB decoding unit 710 may include an entropy decoding unit 811, an inverse quantization unit 813, an inverse space transform unit 815, an inverse color transform unit 817, a motion compensation unit 819, a reference image storage unit 821, and an addition unit 823. Likewise, the RGB decoding unit 710 may employ a decoding method complying with ISO/IEC MPEG-4 video encoding international standard, or H.264/MPEG-4 pt.10 AVC standardization technology of JVT of ISO/IEC MPEG and ITU-T VCEG, but is not limited thereto, and may have a similar structure to the decoding method, except the inverse color transform unit 817, for example.

Figure 9A:
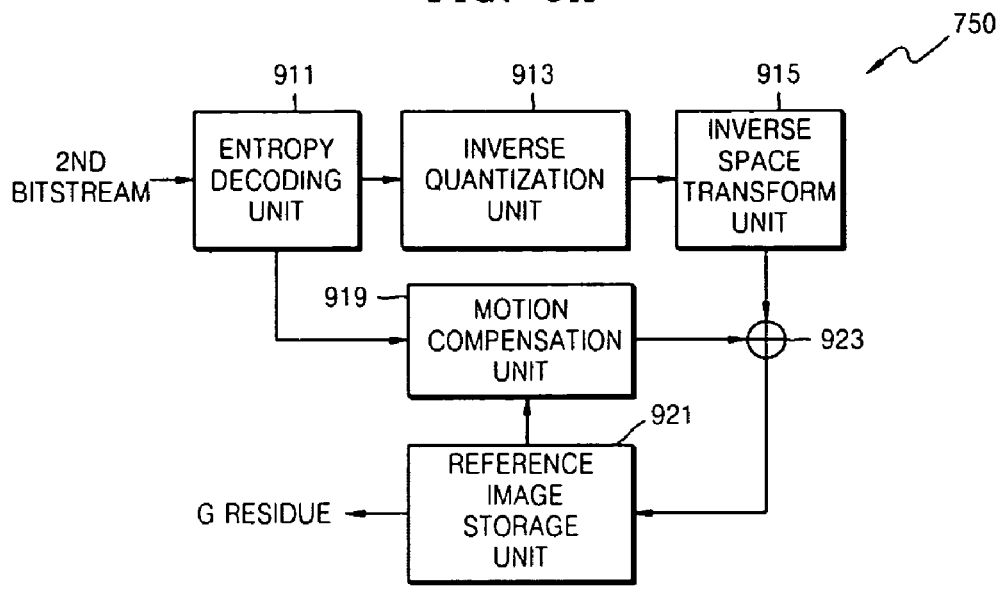
FIGS. 9A and 9B illustrate a G residue decoding unit, such as that illustrated in FIG. 7, according to an embodiment of the present invention.
Figure 9B:
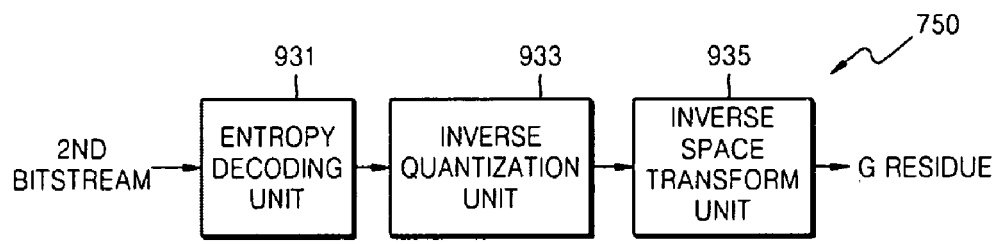

FIGS. 9A and 9B illustrate a G residue decoding unit 750, such as that illustrated in FIG. 7, according to embodiments of the present invention. The G residue decoding unit 750 illustrated in FIG. 9A may correspond to the G residue encoding unit 490, as illustrated in FIG. 6A, and may include an entropy decoding unit 911, an inverse quantization unit 913, an inverse space transform unit 915, a motion compensation unit 919, a reference image storage unit 921, and an addition unit 923, for example.

This will now be explained briefly. Here, the entropy decoding unit 911 may interpret an input bitstream to extract encoded G residue data and encoding information.

The inverse quantization unit 913 may further perform inverse quantization of the extracted encoded G residue data.

The inverse transform unit 915 may still further perform inverse frequency space transform, such as inverse DCT (IDCT), for example, of the inverse-quantized G residue data.

The motion compensation unit 919 may then restore a G residue, by performing spatiotemporal estimation of the G residue data that is inverse frequency space transformed, by using a G residue of a restored previous image.

The G residue decoding unit 750 illustrated in FIG. 9B may correspond to the G residue encoding unit 490, as illustrated in FIG. 6B, and may include an entropy decoding unit 931, an inverse quantization unit 933 and an inverse space transform unit 935. The G residue decoding unit 750 illustrated in FIG. 9B has an advantage in that it may be easier to implement than the G residue decoding unit 750 illustrated in FIG. 9A.

Referring to FIG. 9B, in the entropy decoding unit 931, a G residue may be separated from a bitstream and entropy decoded.

In the inverse quantization unit 933, the entropy-decoded G residue may be inverse quantized.

In the inverse space transform unit 935, the inverse-quantized G residue may further be inverse frequency space transformed so that a restored G residue is generated.

Thus, the sensor image encoding system and/or the sensor image decoding system, according to an embodiment of the present invention, such as illustrated in FIGS. 3 through 9A and 9B, have an advantage of being capable of removing errors that can occur due to color transform and sampling of an input image. Also, unlike other images, because of the characteristic of a sensor image, a sampled 4:2:0 format RGB image is similar to a 4:2:0 format YUV image, and in particular, in relation to a G component that is visually important, the RGB image has an advantage in that higher picture qualities can be restored compared to the 4:2:0 format YUV image.

Figure 10A:
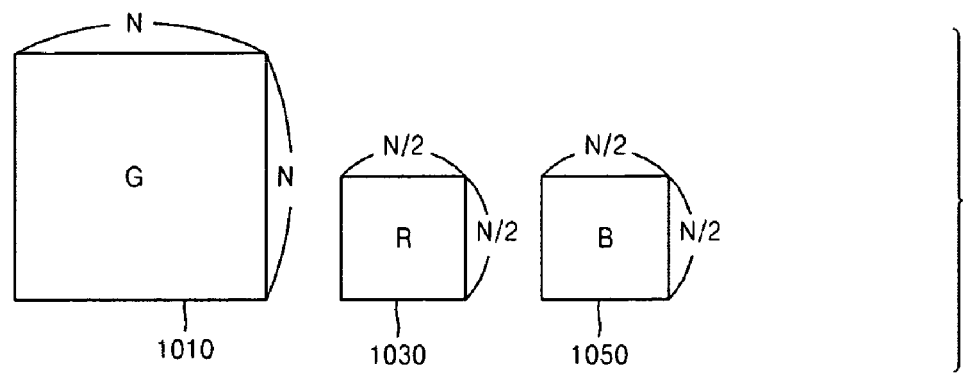
FIGS. 10A and 10B illustrate macroblocks of a 4:2:0 format and macroblocks that may actually be processed in an encoding process, respectively, according to an embodiment of the present invention.
Figure 10B:
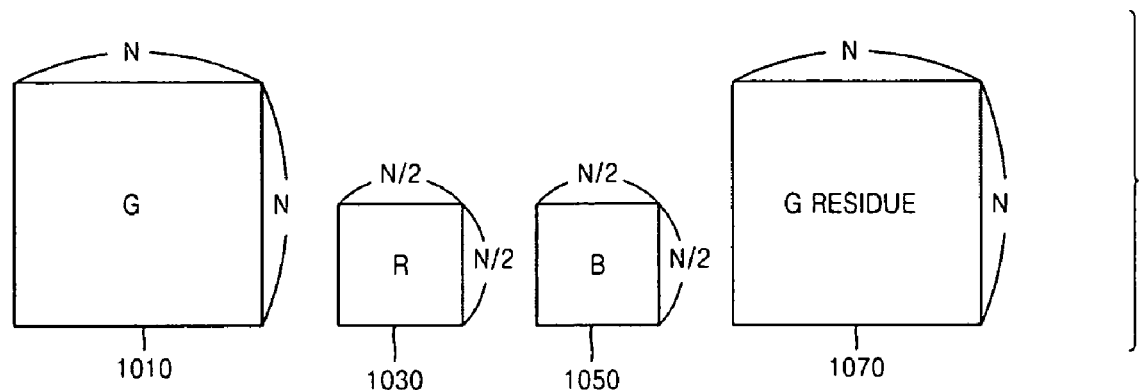

FIG. 10A illustrates macroblocks that are units of processing in a 4:2:0 format RGB image. A G component 1010 may have a size of N×N pixels (here, as an example, N is 16), and each of an R component 1030 and a B component 1050 may have a size of N/2×N/2 pixels, for example. Meanwhile, FIG. 10B illustrates macroblocks that may be actually processed in the encoding process and further includes a G residue component 1070 having a size of N×N pixels.

Figure 11:
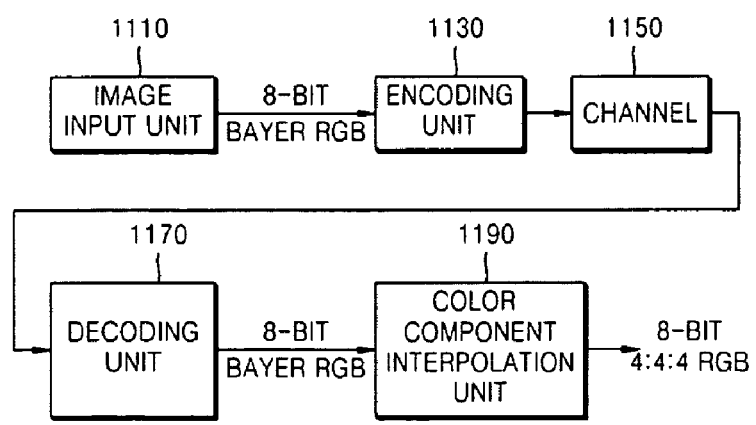
FIG. 11 illustrates a sensor image encoding system and/or a sensor image decoding system according, to an embodiment of the present invention.

FIG. 11 illustrates a sensor image encoding system and/or a sensor image decoding system, according to an embodiment of the present invention. The sensor image encoding system may include an image input unit 1110 and an encoding unit 1130, for example, and the sensor image decoding system may include a decoding unit 1170 and a color component interpolation unit 1190, for example. Here, the sensor image encoding system and/or the sensor image decoding system may be integrally included in a single device of a server side or a client side, for example, though embodiments of the present invention are not limited thereto.

Referring to FIG. 11, the image input unit 1110 may receive an input of a predetermined pattern, e.g., an 8-bit Bayer format RGB image having a repetitive pattern of a 2×2 size, such as the image illustrated in FIG. 2.

In the encoding unit 1130, an 8-bit Bayer format RGB image, e.g., provided from the image input unit 1110, may be compressed to generate a bitstream, and the generated bitstream may then be provided to the decoding unit 1170, e.g., through a channel 1150. Here, the channel 1150 may be omitted or can be replaced by a storage medium, such as a USB memory, for example, noting that alternative embodiments are equally available.

In the decoding unit 1170, a bitstream transmitted through the channel 1150, for example, may be decoded to restore an 8-bit Bayer format RGB image.

In the color component interpolation unit 1190, an 8-bit Bayer format image, e.g., provided from the decoding unit 1170, may be input and interpolation may be performed for a color component that is absent in each pixel using adjacent pixel values so that each pixel has all of R, G, and B components. As a result, an 8-bit 4:4:4 format RGB image may be generated.

The encoding unit 1130 illustrated in FIG. 11 has an advantage in that redundancy of data does not occur, because the Bayer format RGB image may be directly encoded without a separate interpolation process, unlike the aforementioned encoding unit 330 illustrated in FIG. 3.

Figure 12:
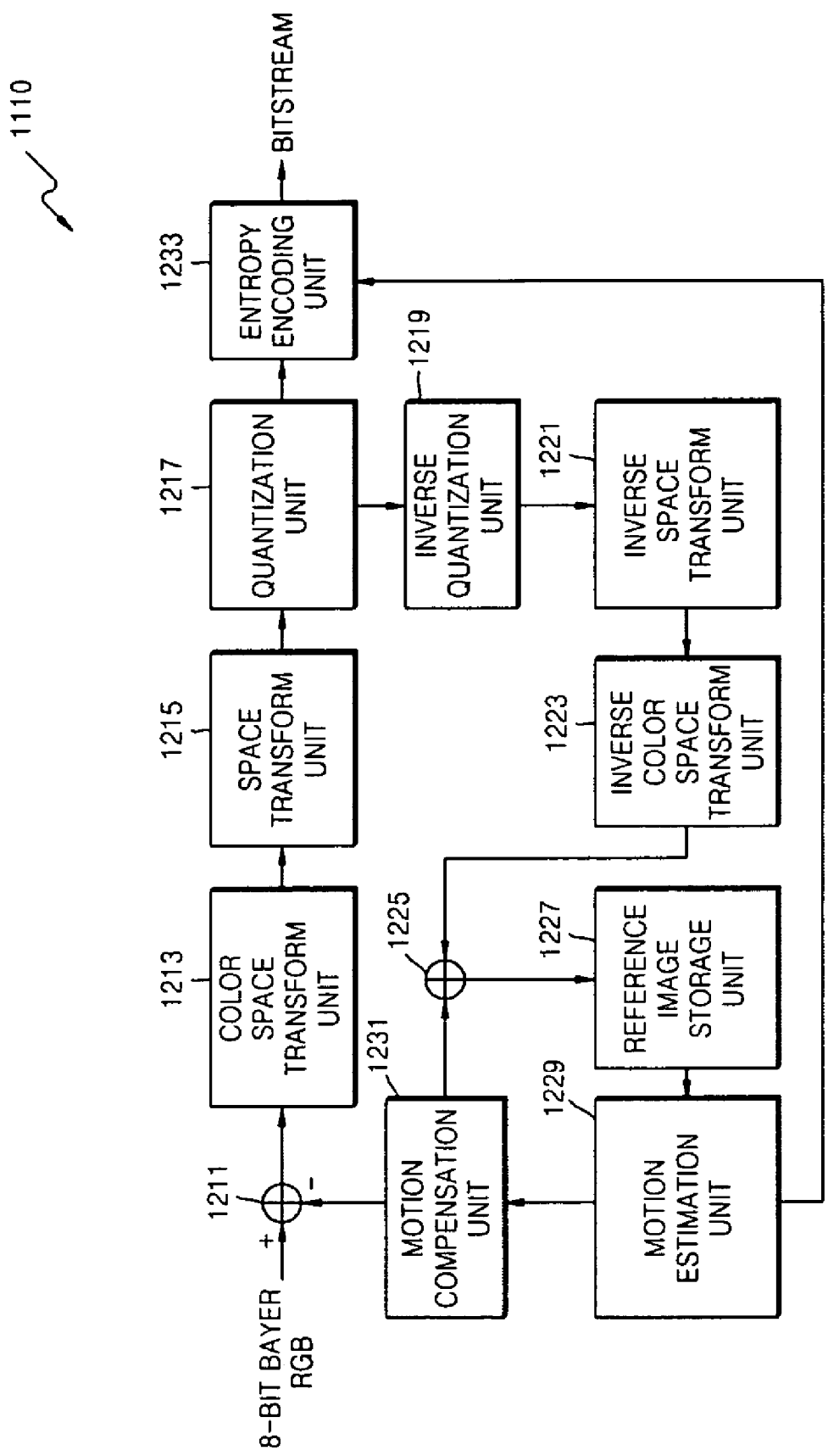
FIG. 12 illustrates an encoding unit, such as that illustrated in FIG. 11, according to an embodiment of the present invention.

FIG. 12 illustrates an encoding unit 1130, such as that illustrated in FIG. 11, according to an embodiment of the present invention. The encoding unit 1130 may include a subtraction unit 1211, a color space transform unit 1213, a space transform unit 1215, a quantization unit 1217, an inverse quantization unit 1219, an inverse space transform unit 1221, an inverse color space transform unit 1223, an addition unit 1225, a reference image storage unit 1227, a motion estimation unit 1229, a motion compensation unit 1231, and an entropy encoding unit 1233, for example. When compared with the RGB encoding unit 430, as illustrated in FIG. 5, the encoding unit 1130 of FIG. 12 may further include the color space transform unit 1213 and the inverse color space transform unit 1223, for example.

In the color space transform unit 1213, in relation to each color component in a 2×2 repetitive pattern, color space transform may be performed through spatial DCT, integer transform in which DCT is modified to an integer-unit operation, or Hadamard transform, for example, so that redundancy between color components is removed.

For example, the color space transform may be performed through Hadamard transform of a 4×1 size or 2×2 size, as defined in the following Equations 5 and 6, respectively, for example.

$$\begin{bmatrix} R' \\ G' \\ G' \\ B' \end{bmatrix} = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \cdot \begin{bmatrix} R \\ G \\ G \\ B \end{bmatrix}$$  Equation 5

$$\begin{bmatrix} R' & G' \\ G' & B' \end{bmatrix} = \begin{bmatrix} 1 & 1 \\ 1 & -1 \end{bmatrix} \cdot \begin{bmatrix} R & G \\ G & B \end{bmatrix} \cdot \begin{bmatrix} 1 & 1 \\ 1 & -1 \end{bmatrix}$$  Equation 6

Here, Equation 5 represents a 1-dimensional Hadamard transform and Equation 6 represents a 2-dimensional Hadamard transform. The Hadamard transform has an advantage that it can show optimum performance in relation to a more variety of types of images compared to the RCT.

In the inverse color space transform unit 1223, in relation to each color component in a 2×2 repetitive pattern, inverse color space transform may be performed through inverse spatial DCT, inverse integer transform in which inverse DCT is modified to an integer-unit operation, or inverse Hadamard transform, so that R, G and B color components are restored.

For example, the inverse color space transform may be performed through inverse Hadamard transform of a 4×1 size or 2×2 size, as defined in the following Equations 7 and 8, respectively, for example.

$$\begin{bmatrix} R'' \\ G'' \\ G'' \\ B'' \end{bmatrix} = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \cdot \begin{bmatrix} R' \\ G' \\ G' \\ B' \end{bmatrix} // 4$$  Equation 7

$$\begin{bmatrix} R'' & G'' \\ G'' & B'' \end{bmatrix} = \begin{bmatrix} 1 & 1 \\ 1 & -1 \end{bmatrix} \cdot \begin{bmatrix} R' & G' \\ G' & B' \end{bmatrix} \cdot \begin{bmatrix} 1 & 1 \\ 1 & -1 \end{bmatrix} // 4$$  Equation 8

Here, "//" is an operation for mapping into a nearest integer after a division operation is performed, and is performed in order to express a data range that is extended, in the original data range in the inverse transform process.

Figure 13:
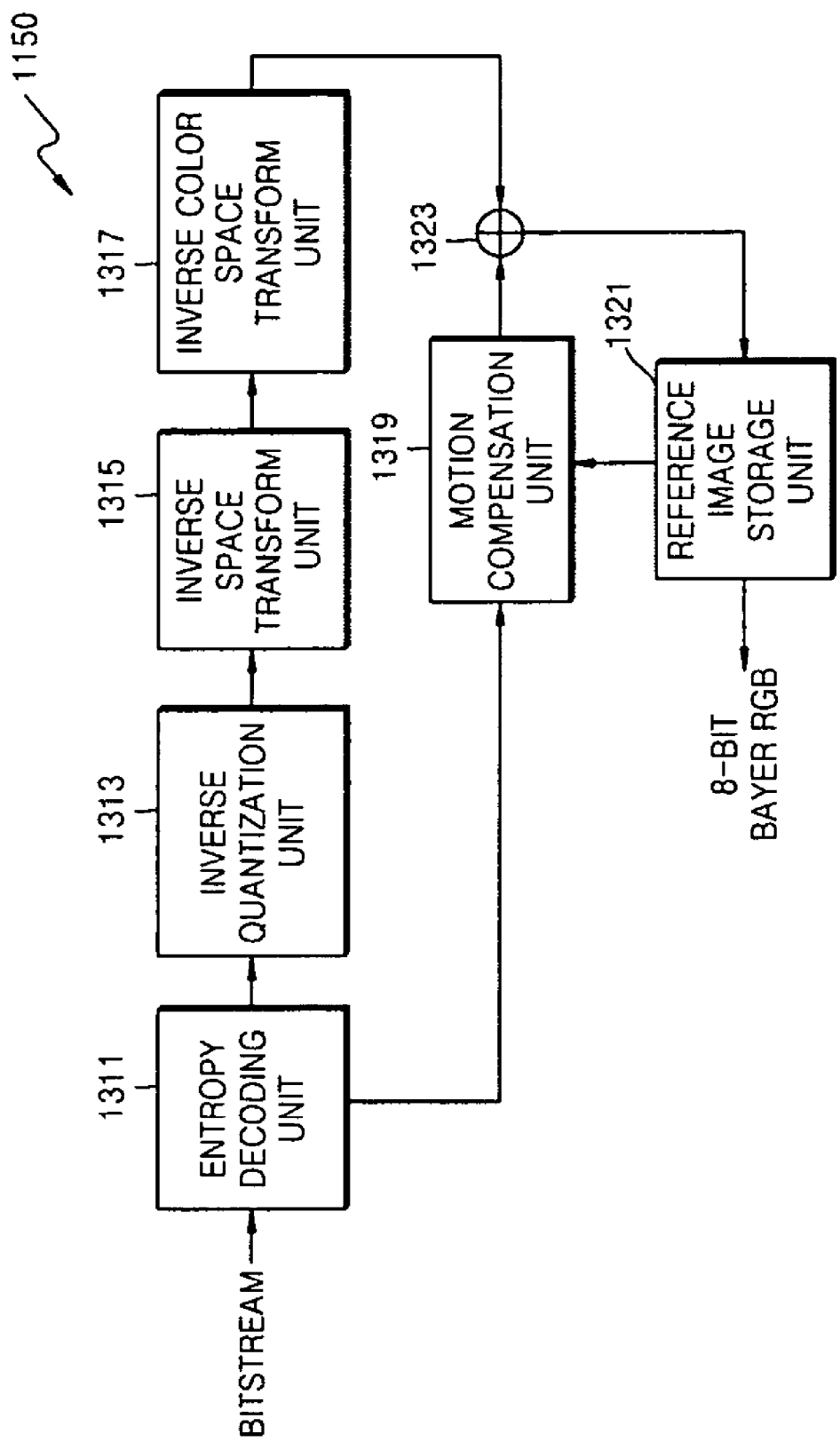
FIG. 13 illustrates a decoding unit, such as that illustrated in FIG. 11, according to an embodiment of the present invention.

FIG. 13 illustrates a decoding unit 1150, such as that illustrated in FIG. 11, according to an embodiment of the present invention. The decoding unit 1150 may include an entropy decoding unit 1311, an inverse quantization unit 1313, an inverse space transform unit 1315, an inverse color space transform unit 1317, a motion compensation unit 1319, a reference image storage unit 1321, and an addition unit 1323. When compared with the RGB decoding unit 710, as illustrated in FIG. 8, the decoding unit 1150 of FIG. 13 may further include the inverse color space transform unit 1317. The inverse color space transform unit 1317 may perform, for example, the inverse Hadamard transform of a 4×1 size or 2×2 size, as defined in Equations 7 and 8, respectively, for example.

Figure 14:
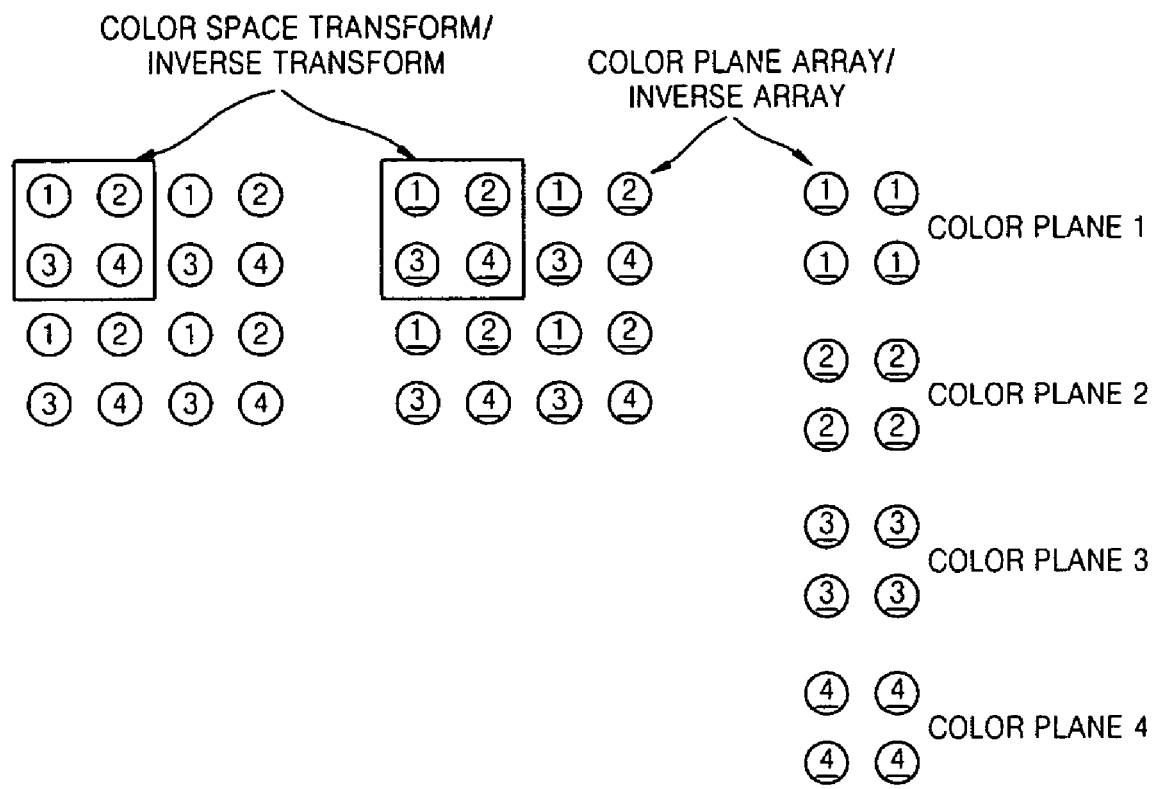
FIG. 14 illustrates color space transform and inverse color space transform, such as that in FIGS. 12 and 13, respectively, according to an embodiment of the present invention.

FIG. 14 illustrates color space transform and inverse color space transform in FIGS. 12 and 13, respectively, according to an embodiment of the present invention.

In the color space transform unit 1213, color space transform may be performed and then, color space transform data arrayed as a color plane in relation to 4 components, for example, and processed. Meanwhile, in the inverse color space transform unit 1223 and 1317, inverse arraying in relation to a color plane may be performed and then, inverse color space transform performed.

Figure 15A:
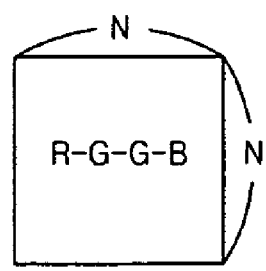
FIGS. 15A and 15B illustrate a macroblock that is a unit for processing a Bayer format RGB image, according to an embodiment of the present invention.
Figure 15B:
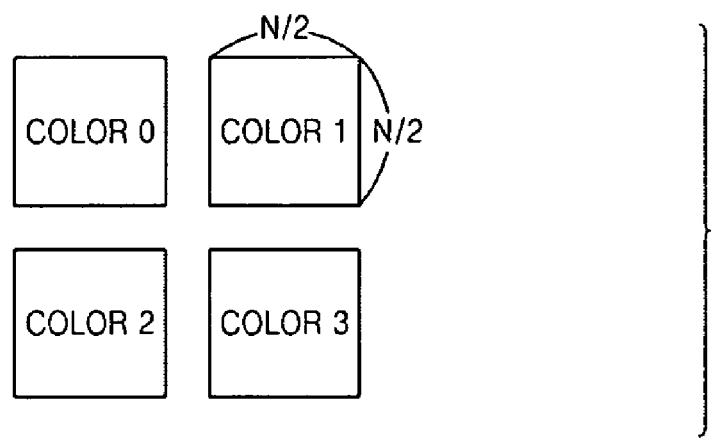

FIG. 15A illustrates a macroblock that is a unit for processing a Bayer format RGB image, with the macroblock having a 2×2 repetitive pattern of R-G-G-B components and a size of N×N pixels, for example. Meanwhile, FIG. 15B illustrates macroblock information formed with 4-color information arrayed, again after the color space transform is performed.

Figure 16A:
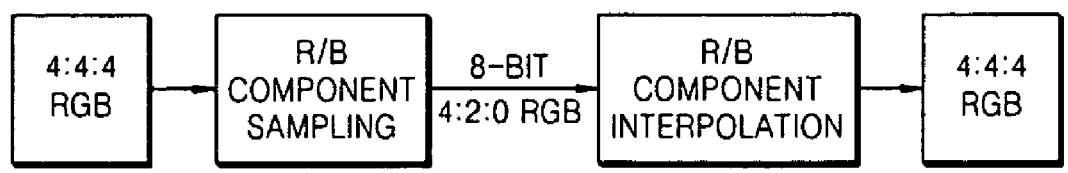
FIGS. 16A through 16C are diagrams that help illustrate a comparison of picture qualities of restored RGB images after images are color transformed and sampled into a variety of formats, according to an embodiment of the present invention.
Figure 16B:
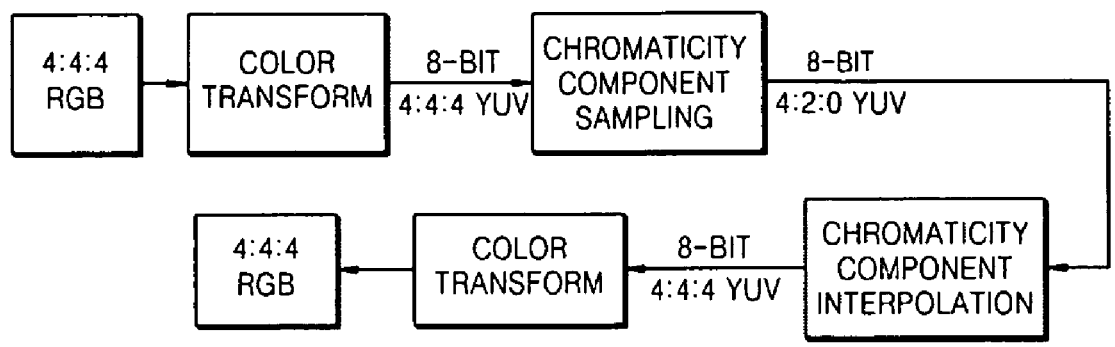
Figure 16C:

FIGS. 16A through 16C are diagrams to help compare picture qualities of restored RGB images after images are color transformed and sampled into a variety of formats, according to an embodiment of the present invention. FIG. 16A illustrates the case where a 4:4:4 format RGB image is color transformed or sampled into a 4:2:0 format RGB image, FIG. 16B illustrates the case where a 4:4:4 format RGB image is color transformed or sampled into a 4:2:0 format YUV image, and FIG. 16C illustrates the case where a 4:4:4 format RGB image is color transformed or sampled into a Bayer format RGB image.

First, the following Table 1 shows a comparison between a restored 4:2:0 format RGB image and a restored 4:2:0 format YUV image, illustrated in FIGS. 16A and 16B, respectively, when a 4:4:4 format RGB image is captured through 3 CCD plates.

TABLE 1

| Sequence | Method | PSNR (R) | PSNR (G) | PSNR (B) | PSNR (RGB) |
|---|---|---|---|---|---|
| Breeze | Yuv4:2:0 | 38.73 | 47.44 | 38.90 | 40.29 |
|  | RGB4:2:0 | 35.31 | ∞ | 35.96 | 37.38 |
| KungFu | Yuv4:2:0 | 39.65 | 48.09 | 39.51 | 41.04 |
|  | RGB4:2:0 | 37.30 | ∞ | 37.40 | 39.11 |
| Night | Yuv4:2:0 | 38.99 | 47.84 | 38.71 | 40.35 |
|  | RGB4:2:0 | 35.25 | ∞ | 35.66 | 35.90 |
| Plane | Yuv4:2:0 | 38.24 | 47.00 | 39.43 | 40.24 |
|  | RGB4:2:0 | 33.63 | ∞ | 36.72 | 35.08 |
| Waves | Yuv4:2:0 | 40.84 | 49.60 | 42.12 | 42.88 |
|  | RGB4:2:0 | 36.66 | ∞ | 38.80 | 39.36 |

Similarly, the following Table 2 shows the comparison between a restored 4:2:0 format RGB image and a restored 4:2:0 format YUV image, illustrated in FIGS. 16A and 16B, respectively, when a 4:4:4 format RGB image is captured through one CCD plate.

TABLE 2

| Sequence | Method | PSNR (R) | PSNR (G) | PSNR (B) | PSNR (RGB) |
|---|---|---|---|---|---|
| Breeze | Yuv4:2:0 | 44.91 | 53.42 | 42.24 | 44.92 |
|  | RGB4:2:0 | 44.87 | ∞ | 45.98 | 47.15 |
| KungFu | Yuv4:2:0 | 47.16 | 54.86 | 43.95 | 46.79 |
|  | RGB4:2:0 | 44.21 | ∞ | 44.48 | 46.11 |
| Night | Yuv4:2:0 | 45.75 | 55.32 | 41.63 | 44.85 |
|  | RGB4:2:0 | 42.68 | ∞ | 43.23 | 44.71 |
| Plane | Yuv4:2:0 | 44.34 | 53.11 | 42.57 | 44.90 |
|  | RGB4:2:0 | 38.44 | ∞ | 42.76 | 41.84 |
| Waves | Yuv4:2:0 | 45.75 | 54.20 | 44.28 | 46.46 |
|  | RGB4:2:0 | 44.74 | ∞ | 46.46 | 47.27 |

Here, Table 1 illustrates that a high picture quality sensor image can be obtained from the 3 CCD plates, as the performance of the peak signal-to-noise ratio (PSNR) of the restored 4:2:0 format YUV image is better than that of the restored 4:2:0 format RGB image. This is because, in case of a restored YUV image, most energy is concentrated on a luminance (Y) component and sampling in the chromaticity (U, V) components does not have a meaningful influence on the picture quality. Meanwhile, Table 2 illustrates that in a sensor image obtained from one CCD plate, which is generally used in mobile devices, the restored 4:2:0 format RGB image has a picture quality similar to or better than that of the restored 4:2:0 format YUV image. Also, when Tables 1 and 2 are compared with each other, it can be seen that where one CCD plate is used, if a 4:2:0 format RGB image is encoded and decoded as in the embodiment of the present invention, the picture quality of a restored image is rarely affected by sampling because the PNSR of restored color components is high. In particular, it can be seen that when one CCD plate or three CCD plates are used, the G component, which is important in the 4:2:0 format RGB image, is completely restored.

Next, the following Table 3 shows a comparison between the picture qualities of the restored 4:2:0 format YUV image and the restored Bayer format RGB image, illustrated in FIGS. 16B and 16C, respectively.

TABLE 3

| Sequence | Method | PSNR (R) | PSNR (G) | PSNR (B) | PSNR (RGB) |
|---|---|---|---|---|---|
| Breeze | RGB4:2:0 | 44.87 | ∞ | 45.98 | 47.15 |
|  | Bayer CFA | 44.87 | 47.46 | 45.98 | 45.98 |
| KungFu | RGB4:2:0 | 44.21 | ∞ | 44.48 | 46.11 |
|  | Bayer CFA | 44.21 | 45.44 | 44.48 | 44.68 |
| Night | RGB4:2:0 | 42.68 | ∞ | 43.23 | 44.71 |
|  | Bayer CFA | 42.68 | 43.41 | 43.23 | 43.10 |
| Plane | RGB4:2:0 | 38.44 | ∞ | 42.76 | 41.84 |
|  | Bayer CFA | 38.44 | 40.52 | 42.76 | 40.22 |
| Waves | RGB4:2:0 | 44.74 | ∞ | 46.46 | 47.27 |
|  | Bayer CFA | 44.74 | 46.27 | 46.46 | 45.75 |

Here, Table 3 illustrates that the PSNR performance of the restored Bayer format RGB image is lower than that of the restored 4:2:0 format RGB image because, in relation to the restored Bayer format RGB image, sampling and interpolation of the G component are performed. However, since the difference is very small, the difference may not cause any subjective or noticeable visual difference. That is, it can be seen that even though a Bayer format RGB image may be directly encoded and/or decoded, as in an embodiment of the present invention, degradation of a picture quality of a restored image is not great.

The following Table 4 shows the comparison between picture qualities of a case "A," where position information of an R/B component is not used in the process of sampling a sensor image into a 4:2:0 format RGB image and performing interpolation again in FIG. 16A, and in a case "B" where position information of an R/B component is used in that process.

TABLE 4

| Sequence | Method | PSNR (R) | PSNR (G) | PSNR (B) | PSNR (RGB) |
|---|---|---|---|---|---|
| Breeze | A | 44.87 | ∞ | 40.37 | 43.82 |
|  | B | 44.87 | ∞ | 45.98 | 47.15 |
| KungFu | A | 44.21 | ∞ | 41.72 | 44.55 |
|  | B | 44.21 | ∞ | 44.48 | 46.11 |
| Night | A | 42.68 | ∞ | 39.26 | 42.4 |
|  | B | 42.68 | ∞ | 43.23 | 44.71 |
| Plane | A | 38.44 | ∞ | 40.37 | 41.06 |
|  | B | 38.44 | ∞ | 42.76 | 41.84 |
| Waves | A | 44.74 | ∞ | 40.94 | 44.2 |
|  | B | 44.74 | ∞ | 46.46 | 47.27 |

Unlike the conventional 4:2:0 format YUV restored image, in the case of a 4:2:0 format RGB image, if the sensor image of FIG. 2 is used, G, R, and B components have pixel information on pixels in different positions. Accordingly, only when position information is used for sampling and interpolation, can a correct restored image be obtained. Referring to Table 4, it can be seen that the PSNR performance of case "B", where the relative position information among R, G, and B components is used, is improved compared to that of case "A", where the information is not used. Accordingly, when a 4:2:0 RGB image is encoded and decoded, as in an embodiment of the present invention, relative position information of R, G, B color components may be used to obtain a more improved encoding efficiency.

Figure 17A:
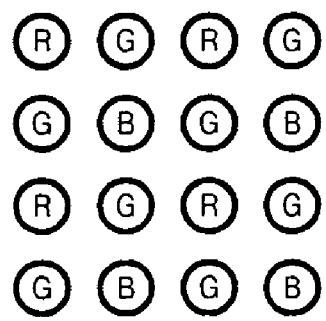
FIGS. 17A through 17D illustrate up/down sampling from a 4:4:4 format RGB image to a 4:2:0 format RGB image when position information of a color component is not considered in a 2×2 repetitive pattern of a Bayer format RGB image, according to an embodiment of the present invention.
Figure 17B:
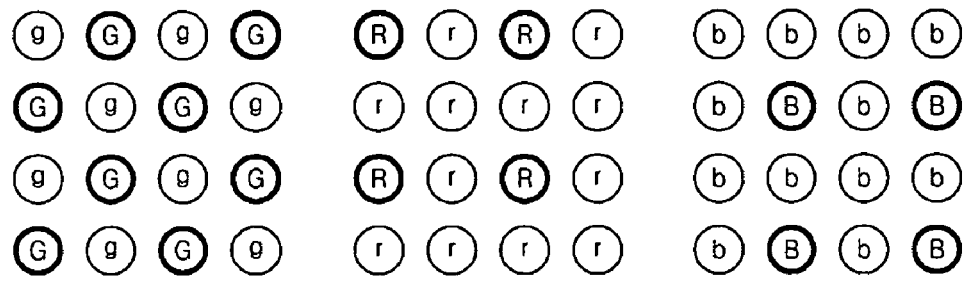
Figure 17C:
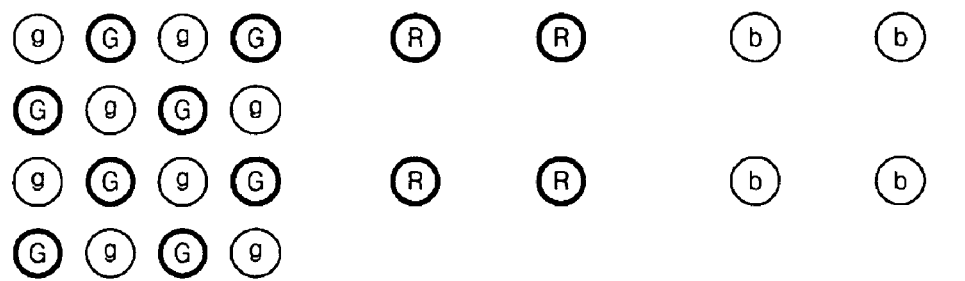
Figure 17D:
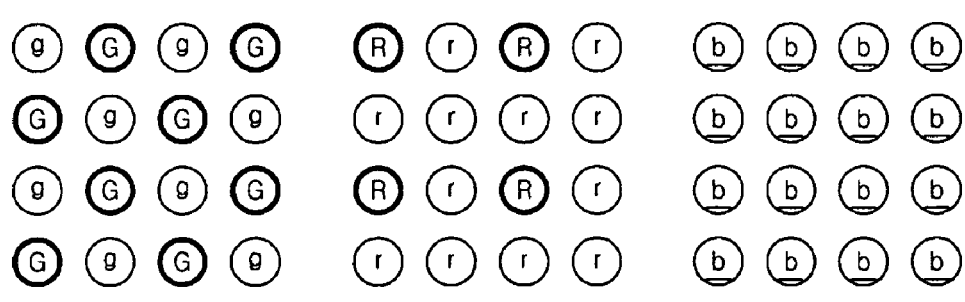

FIGS. 17A through 17D illustrate a process of up/down sampling from a 4:4:4 format RGB image to a 4:2:0 format RGB image when position information of a color component is not considered in a 2×2 repetitive pattern of a Bayer format RGB image, according to an embodiment of the present invention. FIG. 17A shows a Bayer format RGB image having a repetitive pattern of 2×2 units, and FIG. 17B shows R, G, and B color components when a Bayer format RGB image is converted into a 4:4:4 format RGB image. Pixels represented by capital letters correspond with original pixels in FIG. 17A and pixels represented by small letters are values interpolated from pixel values of adjacent Bayer format RGB images. FIG. 17C further shows a 4:2:0 format RGB image sampled from a Bayer format RGB image. Here, the 4:4:4 format RGB image of FIG. 17B is sampled without using the R/B position information of the input image of FIG. 17A. Accordingly, the B component is formed without original B components, but with interpolated B components, as shown in FIG. 17B. If the 4:2:0 format RGB image is restored again into a 4:4:4 format RGB image, as in FIG. 17D, in order to display the 4:2:0 format RGB image, the B component of the restored image becomes very different from the B component of the original 4:4:4 format RGB image of FIG. 17B. This is because position information of each color component of the original Bayer format RGB image in FIG. 17A is absent in the process of obtaining the 4:2:0 format RGB image of FIG. 17C.

FIGS. 18A through 18D illustrate a process of up/down sampling from a 4:4:4 format RGB image to a 4:2:0 format RGB image when position information of a color component is considered in a 2×2 repetitive pattern of a Bayer format RGB image, according to an embodiment of the present invention. Compared with the process illustrated in FIGS. 17A through 17D, in the process illustrated in FIGS. 18A through 18D the restored B component expresses the original B component quite well, by using information that the B component has moved 1 pixel position in the vertical direction and in the horizontal direction, respectively, relative to the R component.

Meanwhile, in order to reduce an interference error during resolution transform, filtering using a filter coefficient with a predetermined length may generally be performed. Nevertheless, position information of each color component also plays an important role in improving the picture quality. In Tables 1 through 4, filters were used in the sampling and interpolation in order to compare performances.

For the sampling, a 7 tap filter [−29, 0, 88, 138, 88, 0, −29] used in the MPEG-2 was used, while for the interpolation, a 6 tap filter [1, −5, 20, 20, −5, 1] used in the H.264/MPEG-4 pt.10 AVC standardization technology of JVT of ISO/IEC MPEG and ITU-T VCEG was used.

Figure 18A:
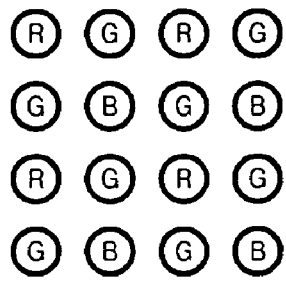
FIGS. 18A through 18D illustrate up/down sampling from a 4:4:4 format RGB image to a 4:2:0 format RGB image when position information of a color component is considered in a 2×2 repetitive pattern of a Bayer format RGB image, according to an embodiment of the present invention.
Figure 18B:
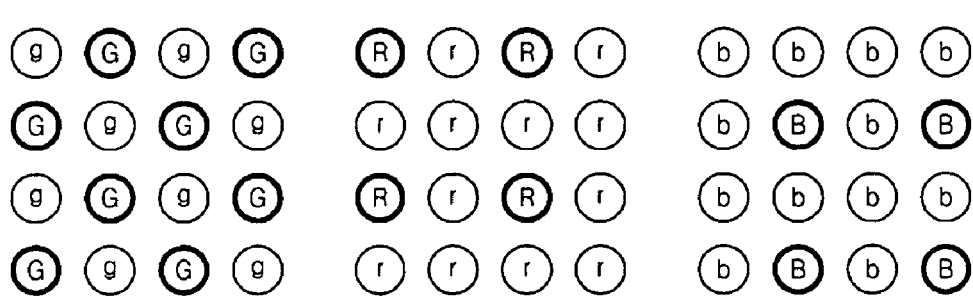
Figure 18C:
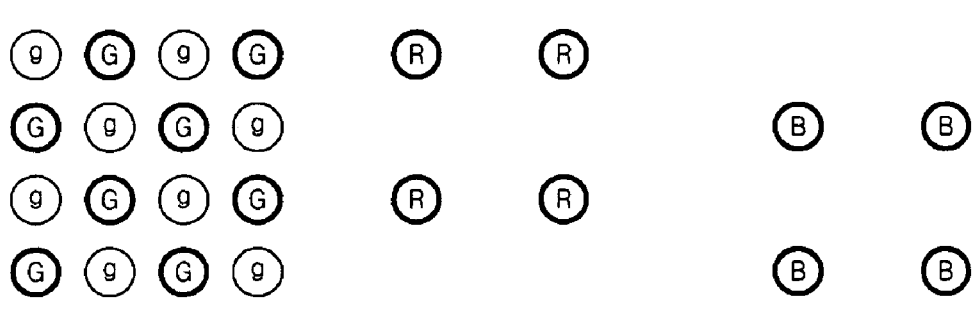
Figures 18D, 19A, 19B:
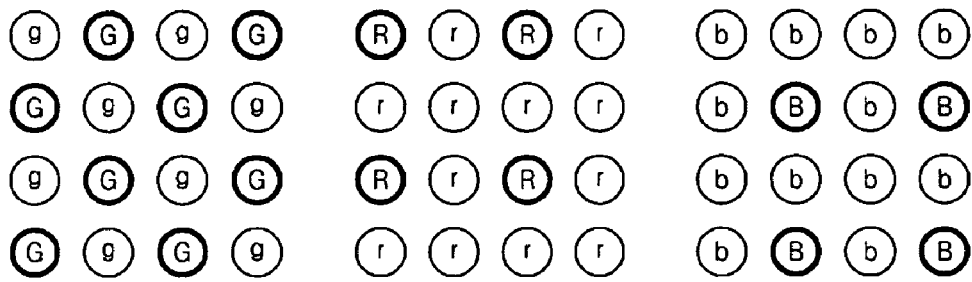
FIGS. 19A and 19B illustrate a variety of types of sensor images having a 2×2 repetitive pattern, according to an embodiment of the present invention.
Figure 20:
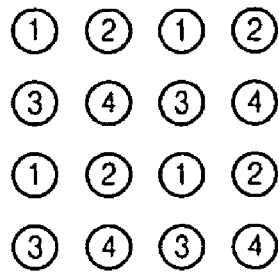
FIG. 20 illustrates position information of a 2×2 repetitive pattern, according to an embodiment of the present invention.

FIGS. 19A and 19B illustrate variety types of sensor images having a 2×2 repetitive pattern, according to an embodiment of the present invention, and show that the positions of R, G, and B components are not fixed in a sensor image and can vary with respect to the sensor unit 110, such as that of FIG. 1. Accordingly, it may be necessary to use position information of each color component in a sensor image encoding and/or decoding system. In order to express position information of each color component, the position information of a 2×2 repetitive pattern in a Bayer RGB image, as illustrated in FIG. 20, may be used. The following Table 5 shows positions of R and B components by using position information of FIG. 20 in a 4:2:0 format RGB image obtained from a sensor image. Here, the position information of each color component was used in the sensor image encoding and/or decoding system of FIG. 7 having an input of a 4:2:0 format RGB image so that the efficiency of encoding can be improved.

TABLE 5

| Code Value | R/B component position information | |
| --- | --- | --- |
| | R | B |
| 0 | 1 | 2 |
| 1 | 2 | 1 |
| 2 | 1 | 3 |
| 3 | 3 | 1 |
| 4 | 1 | 4 |
| 5 | 4 | 1 |
| 6 | 2 | 3 |
| 7 | 3 | 2 |
| 8 | 2 | 4 |
| 9 | 4 | 2 |
| 10 | 3 | 4 |
| 11 | 4 | 3 |

Meanwhile, the sensor image encoding and/or decoding system of FIG. 11, having an input of a Bayer format RGB image, can improve the efficiency of encoding by using relative position information of R, G, and B color components, as expressed in the following Table 6, that is, color pattern information. Likewise, position information illustrated in FIG. 20 may be used.

TABLE 6

| Code Value | 2 × 2 pattern color position information | | |
| --- | --- | --- | --- |
| | R | G | B |
| 0 | 1 | 3.4 | 2 |
| 1 | 2 | 3.4 | 1 |
| 2 | 1 | 2.4 | 3 |
| 3 | 3 | 2.4 | 1 |
| 4 | 1 | 2.3 | 4 |
| 5 | 4 | 2.3 | 1 |
| 6 | 2 | 1.4 | 3 |
| 7 | 3 | 1.4 | 2 |
| 8 | 2 | 1.3 | 4 |
| 9 | 4 | 1.3 | 2 |
| 10 | 3 | 1.2 | 4 |
| 11 | 4 | 1.2 | 3 |

Figure 21:
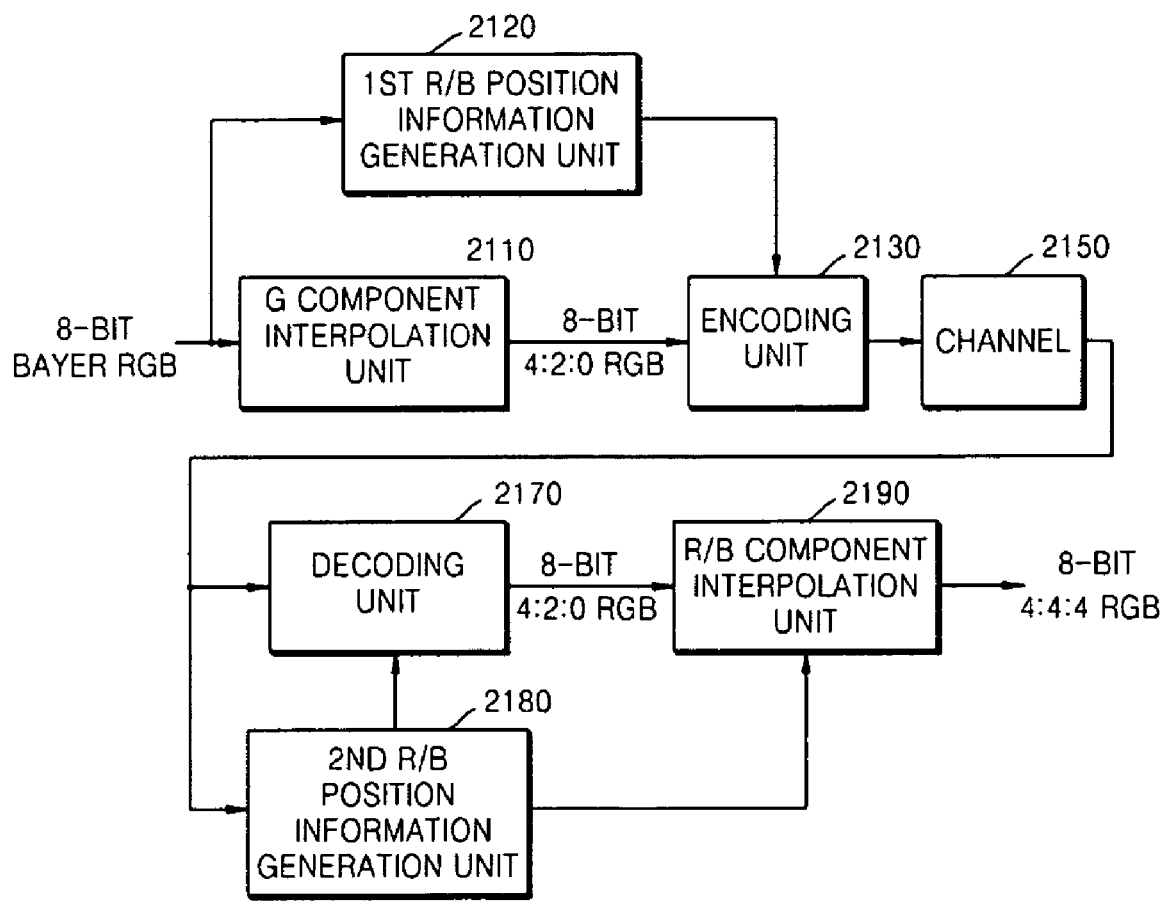
FIG. 21 illustrates a sensor image encoding system and/or a sensor image decoding system, according to an embodiment of the present invention.

FIG. 21 illustrates a sensor image encoding system and/or sensor image decoding system, according to another embodiment of the present invention. The sensor image encoding system may include a G component interpolation unit 2110, a first R/B position information generation unit 2120, and an encoding unit 2130, and the sensor image decoding system may include a decoding unit 2170, a second R/B position information generation unit 2180, and an R/B component interpolation unit 2190. In the sensor image encoding and/or decoding system of FIG. 21, the efficiency of encoding is improved by using the position information of the R/B component of Table 5, for example, and the first and second R/B position information generation units 2120 and 2180 may be added to the sensor image encoding and/or decoding system illustrated in FIG. 3.

Referring to FIG. 21, in the G component interpolation unit 2110, a G component may be interpolated in a sensor image and the sensor image may be converted into a 4:2:0 format RGB image.

In the first R/B position information generation unit 2120, position information of R and B components in the sensor image may be generated.

In the encoding unit 2130, by using the position information of the R and B components, R, G and B components of a 4:2:0 format RGB image and a G residue component may be encoded to generate a bitstream. In the encoding unit 2130, motion estimation of the G component may be performed and then, by using motion estimation information of the G component, encoding of the remaining R and B components may be performed, for example. Since the position information of the R and B components may be different from the position of the G component, the position information of the R and B components may be used in the motion estimation. Since the G component is sampled and then encoded, the resolution of the G component may be the same as those of the R and B components. For example, the G component uses a motion vector of a ¼ pixel unit and each of the R and B components uses a motion vector of a ⅛ pixel unit. In this case, if the Bayer format sensor image of FIG. 2 is considered, the motion vector (mvx_G, mvy_G) of the G component can be expressed by using motion vectors (mvx_R, mvy_R, mvx_B, mvy_B) of R and B components, as the following Equation 9.

$$mvx\_R = mvx\_G,$$

$$mvy\_R = mvy\_G,$$

$$mvx\_B = mvx\_G+2,$$

$$mvy\_B = mvy\_G+2 \qquad \text{Equation 9:}$$

In the second R/B position information generation unit 2180, position information of R and B components may be generated from a bitstream, e.g., as obtained by an encoding of a sensor image.

In the decoding unit 2170, a bitstream may be decoded using position information of R and B components, to restore R, G and B components and a G residue component. Then, by adding the restored G component and G residue component having identical resolutions, a 4:2:0 format RGB image may be restored.

In the R/B component interpolation unit 2190, R and B components may be interpolated in a 4:2:0 format RGB image, e.g., provided from the decoding unit 2170, by using the position information of the R and B components.

Figure 22:
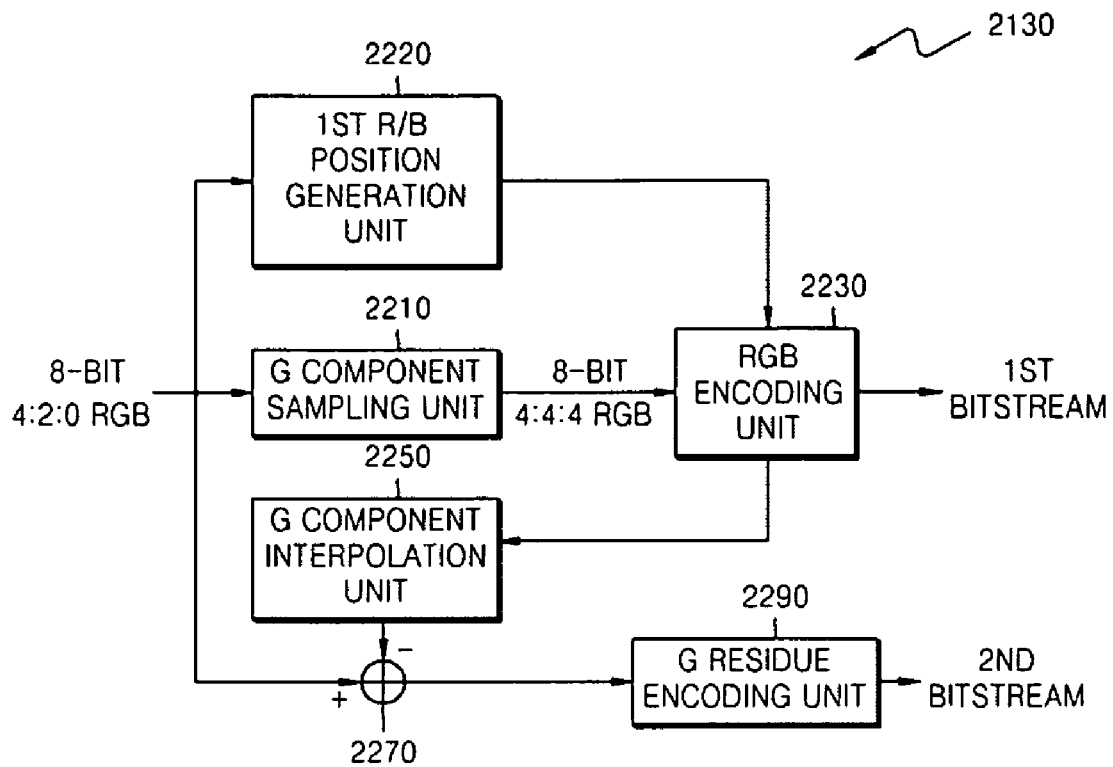
FIG. 22 illustrates an encoding unit, such as that illustrated in FIG. 21, according to an embodiment of the present invention.

FIG. 22 illustrates an encoding unit 2130, such as that illustrated in FIG. 21, according to an embodiment of the present invention. The encoding unit 2130 may include a G component sampling unit 2210, an R/B position information generation unit 2220, an RGB encoding unit 2230, a G component interpolation unit 2250, a subtraction unit 2270, and a G residue encoding unit 2290, for example. Here, the G component interpolation unit 2250, the subtraction unit 2270, and the G residue encoding unit 2290 may be optionally included. The encoding unit 2130, illustrated in FIG. 22, is different from the encoding unit 490, as illustrated in FIG. 4, in that the encoding unit 2130 uses R and B position information in an RGB encoding process.

Figure 23:
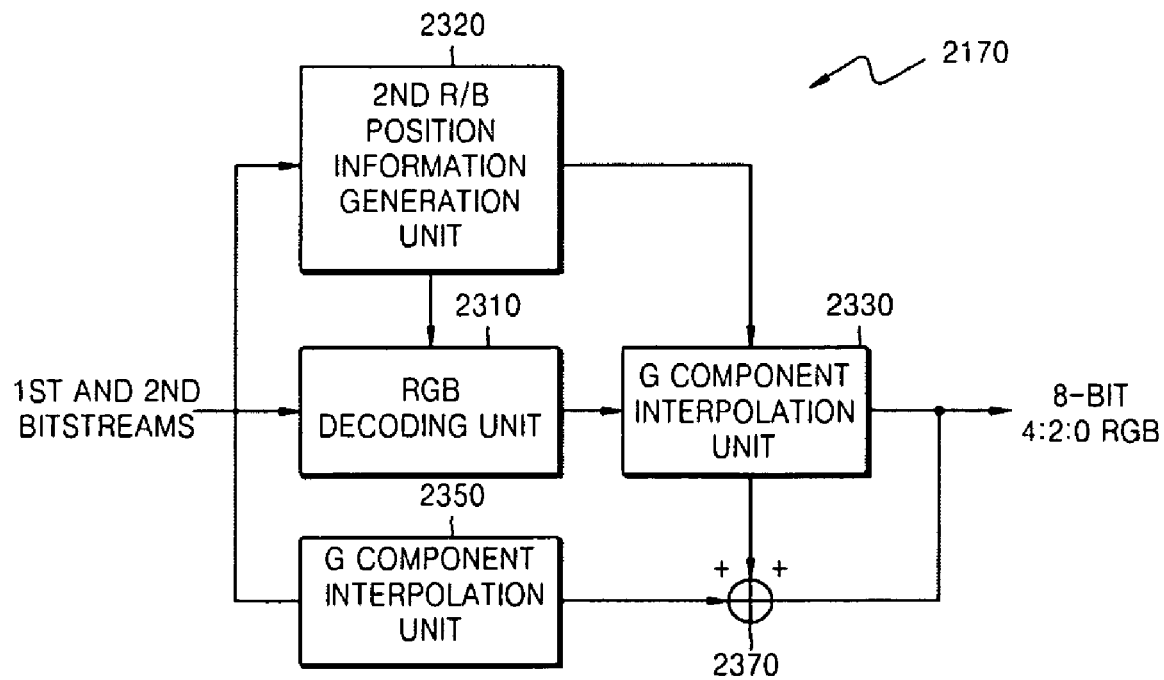
FIG. 23 illustrates a decoding unit, such as that illustrated in FIG. 21, according to an embodiment of the present invention.

FIG. 23 illustrates a decoding unit 2170, such as illustrated in FIG. 21, according to an embodiment of the present invention. The decoding unit 2170 may include an RGB decoding unit 2310, an R/B position information generation unit 2320, a G component interpolation unit 2330, a G residue decoding unit 2350, and an addition unit 2370, for example. Here, the G residue decoding unit 2350, and the addition unit 2370 may be optionally included. The decoding unit 2310, illustrated in FIG. 23, is different from the decoding unit 710, as illustrated in FIG. 7, in that the decoding unit 2310 uses R and B position information in an RGB decoding process and a G component interpolation process.

Figure 24:
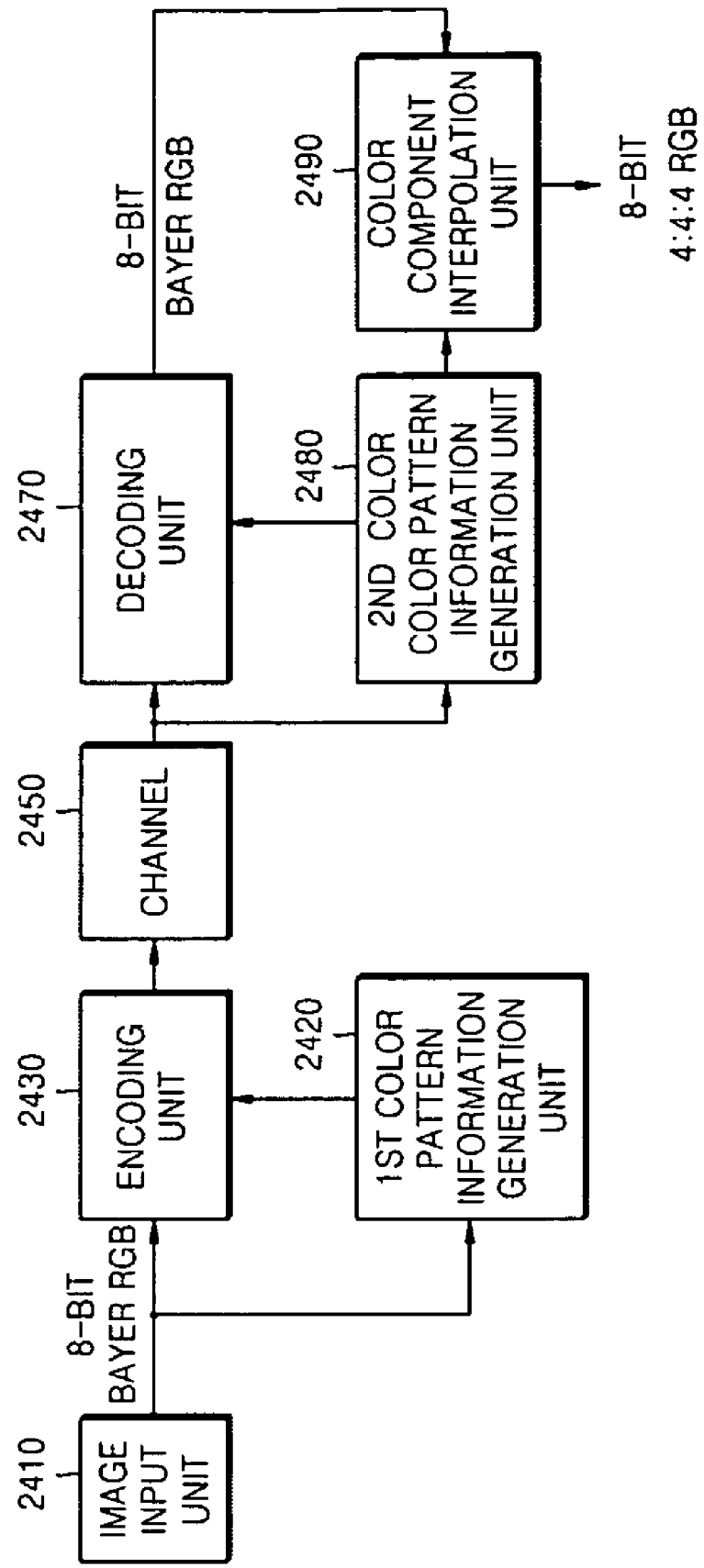
FIG. 24 illustrates a sensor image encoding system and/or a sensor image decoding system, according to an embodiment of the present invention.

FIG. 24 illustrates a sensor image encoding system and/or a sensor image decoding system, according to another embodiment of the present invention. The sensor image encoding system may include an image input unit 2410, a first color pattern information generation unit 2420, an encoding unit 2430, and the sensor image decoding system may include a decoding unit 2470, a second color pattern information generation unit 2480, and a color component interpolation unit 2490. In the sensor image encoding and/or decoding system, as illustrated in FIG. 24, the color pattern information of R, G, and B components of Table 6, for example, may be used in the encoding and decoding process to improve the efficiency of encoding, and the first and second color pattern information generation units 2420 and 2480 are added to the sensor image encoding and decoding system illustrated in FIG. 11, for example. Compared with the sensor image encoding and/or decoding system illustrated in FIG. 21, the sensor image encoding and/or decoding system of FIG. 24 also uses the position information, but is different in that the sensor image encoding and/or decoding system of FIG. 24 can directly use a motion vector of one color component without changing the size of the vector.

Referring to FIG. 24, in the image input unit 2410, a Bayer format RGB image having 4 components, R, G, G, and B, and a predetermined pattern, for example, a repetitive pattern of a 2×2 size, may be input.

In the first color pattern information generation unit 2420, color pattern information of R, G and B components of a Bayer format RGB image is generated.

In the encoding unit 2430, redundancy of each color component existing in a repetitive pattern in a Bayer format RGB image is removed through color space transform, and at the same time, for example, encoding may be performed using color pattern information of R, G and B components to generate a bitstream.

In the second color pattern information generation unit 2480, a bitstream may be decoded so that color pattern information of R, G and B components is generated.

In the decoding unit 2470, a bitstream may be decoded through inverse color space transform and, by using color pattern information of R, G, and B components, a Bayer format RGB image may be restored.

In the color component interpolation unit 2490, color components absent in each pixel in a restored Bayer format RGB image may be interpolated using color pattern information of R, G and B components.

Figures 25A, 25B, 25C:
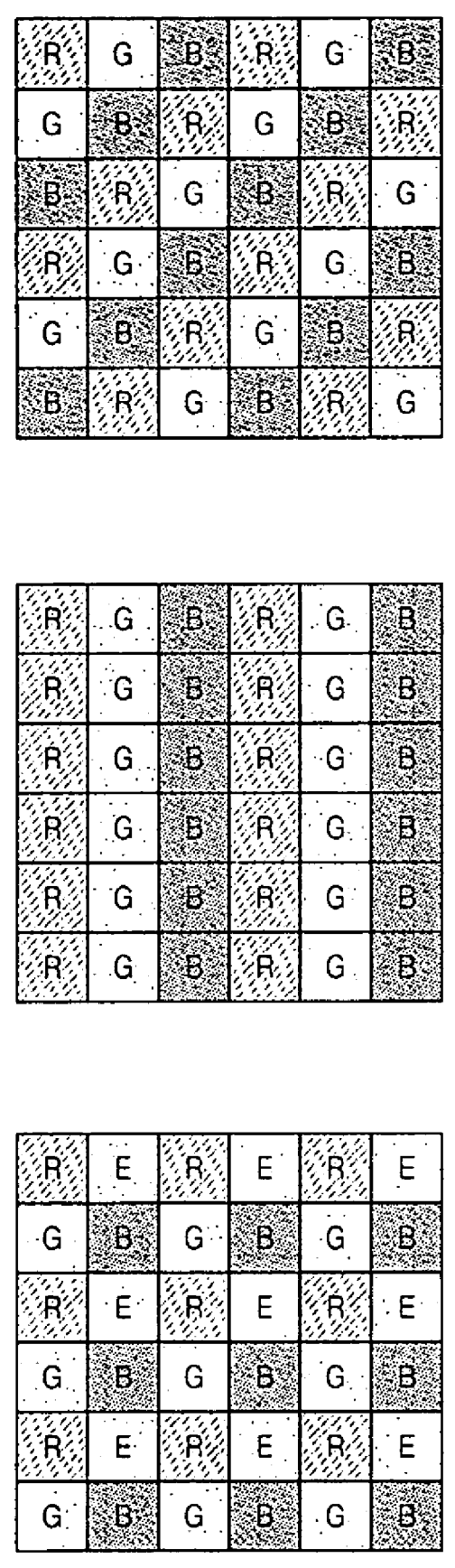

FIGS. 25A through 25C illustrate other types of sensor images, according to an embodiment of the present invention. FIGS. 25A and 25B show cases where R, G, and B components do not show a repetitive pattern of a 2×2 unit, and FIG. 25C shows the case where the sensor unit 110 of FIG. 1 receives an input of a color component other than R, G, and B components. Since it is difficult to apply the sensor image having shapes illustrated in FIGS. 25A through 25C, the sensor image may be converted into a 4:4:4 format RGB image and H.264/MPEG-4 pt.10 AVC FRExt standardization technology of JVT of ISO/IEC MPEG and ITU-T VCEG may be used or by using an ordinary luminance encoding unit (Refer to FIG. 6A) and luminance decoding unit (Refer to FIG. 9A), the entire sensor image may be treated as one luminance image and processed. By doing so, any type of a sensor image can be encoded and decoded.

Figure 26:
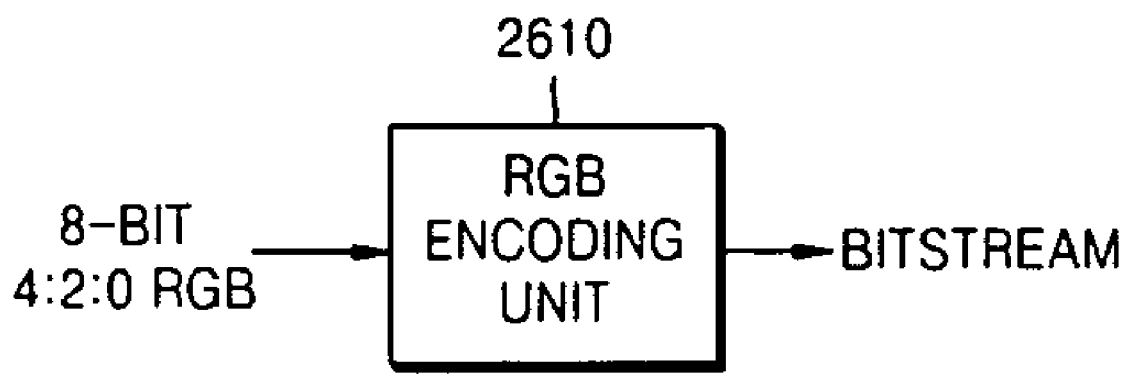
FIG. 26 illustrates an encoding unit, such as that illustrated in FIG. 3, according to another embodiment of the present invention.

FIG. 26 illustrates an encoding unit 330, such as that illustrated in FIG. 3, according to another embodiment of the present invention. The encoding unit 330 may include an RGB encoding unit that directly encodes an input 4:2:0 format RGB image. The encoding unit 330 of FIG. 26 is different from the encoding unit 330 of FIG. 4 in that the encoding unit 330 of FIG. 26 does not need sampling and interpolation of a G component, and by not encoding a G residue component, the encoding unit 330 of FIG. 26 provides an advantage of compatibility with conventional image encoding systems.

Figure 27:
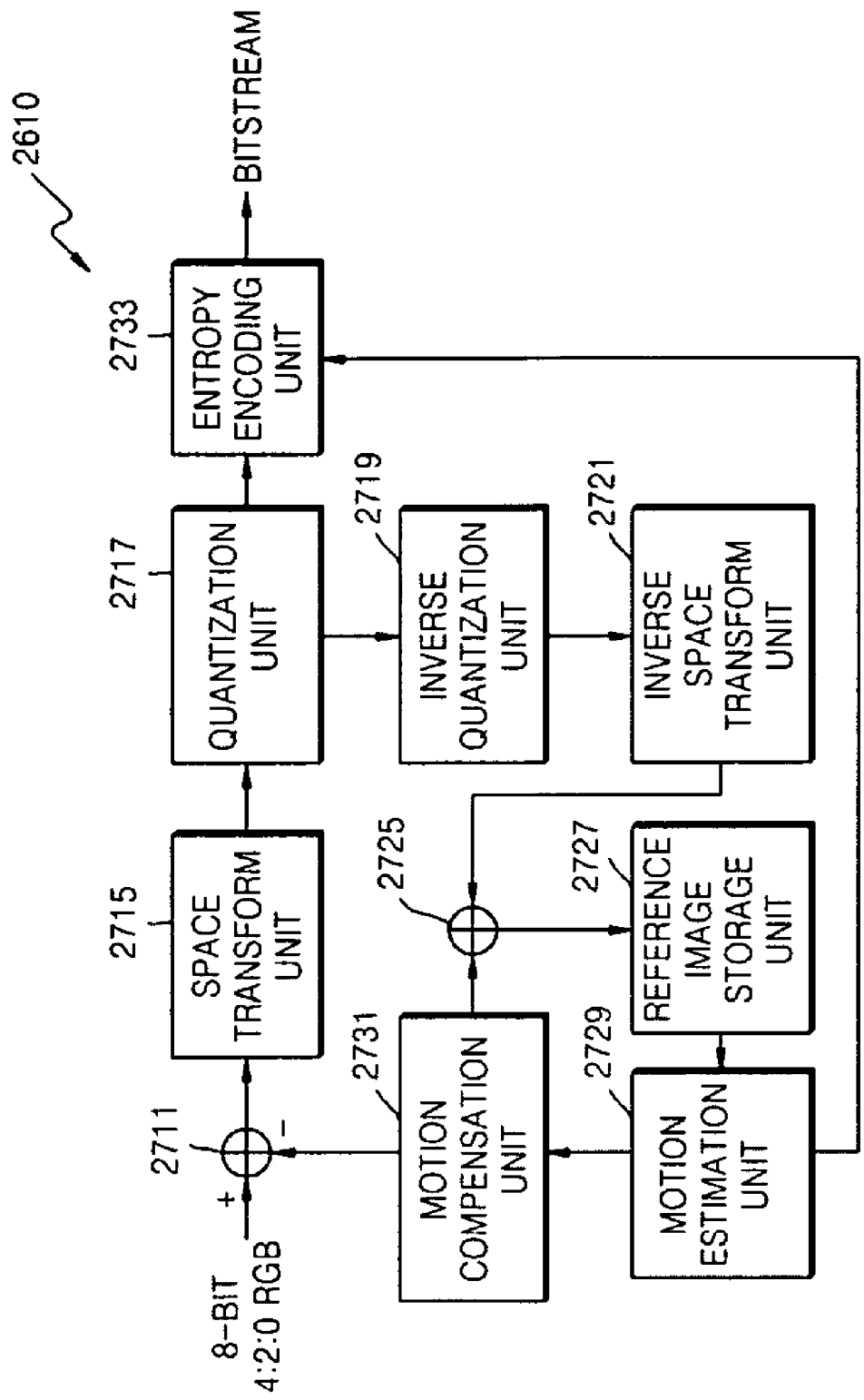
FIG. 27 illustrates an RGB encoding unit, such as that illustrated in FIG. 26, according to an embodiment of the present invention.

FIG. 27 illustrates an RGB encoding unit 2610, such as illustrated in FIG. 26, according to an embodiment of the present invention. The RGB encoding unit 2610 may include a subtraction unit 2711, a space transform unit 2715, a quantization unit 2717, an inverse quantization unit 2719, an inverse space transform unit 2721, an addition unit 2725, a reference image storage unit 2727, a motion estimation unit 2729, a motion compensation unit 2731, and an entropy encoding unit 2733, for example. The RGB encoding unit 2610 may use an 8-bit 4:2:0 format RGB image as an input signal, and except this, the structure and operation of the RGB encoding unit 2610 may be the same as those of the G residue encoding unit 490, as illustrated in FIG. 6A. Accordingly, further detailed explanation of the operation of the RGB encoding unit 2610 will be omitted here.

Figure 28:
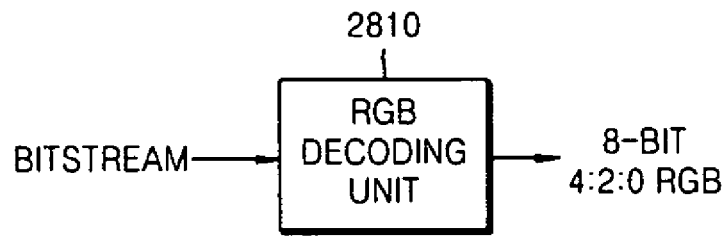
FIG. 28 illustrates a decoding unit, such as that illustrated in FIG. 3, according to an embodiment of the present invention.

FIG. 28 illustrates a decoding unit 370, such as that illustrated in FIG. 3, according to another embodiment of the present invention. The decoding unit 370 of FIG. 28 may include an RGB decoding unit 2810 which restores a 4:2:0 format RGB image by decoding a bitstream.

Figure 29:
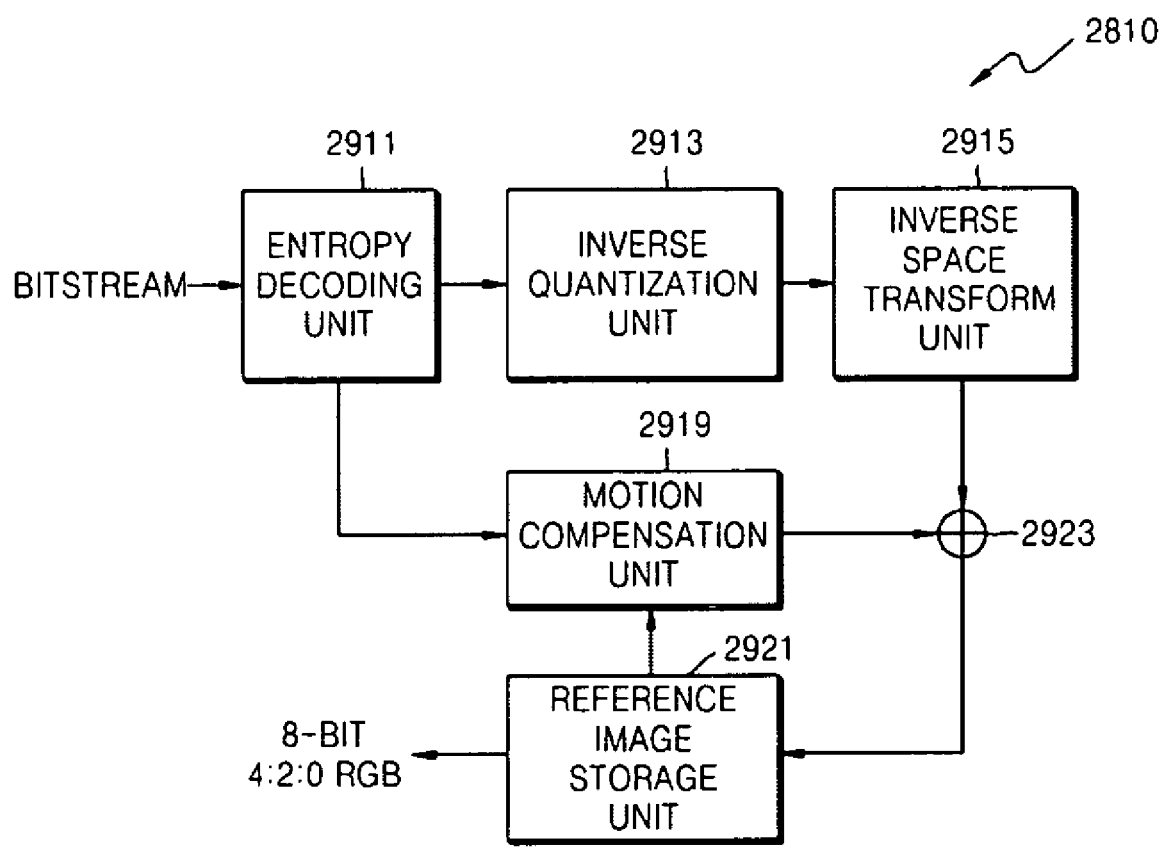
FIG. 29 illustrates an RGB decoding unit, such as that illustrated in FIG. 28, according to an embodiment of the present invention.

FIG. 29 illustrates an RGB decoding unit 2810, such as illustrated in FIG. 28, according to an embodiment of the present invention. The RGB decoding unit 2810 may include an entropy decoding unit 2911, an inverse quantization unit 2913, an inverse space transform unit 2915, a motion compensation unit 2919, a reference image storage unit 2921, and an addition unit 2923, for example. The RGB decoding unit 2810 may directly use a bitstream as an input signal. Except for this, the structure and operation of the RGB decoding unit 2810 may be the same as those of the G residue decoding unit 750, as illustrated in FIG. 9A. Accordingly, further detailed explanation of the operation of the RGB decoding unit 2810 will be omitted here.

Figure 30:
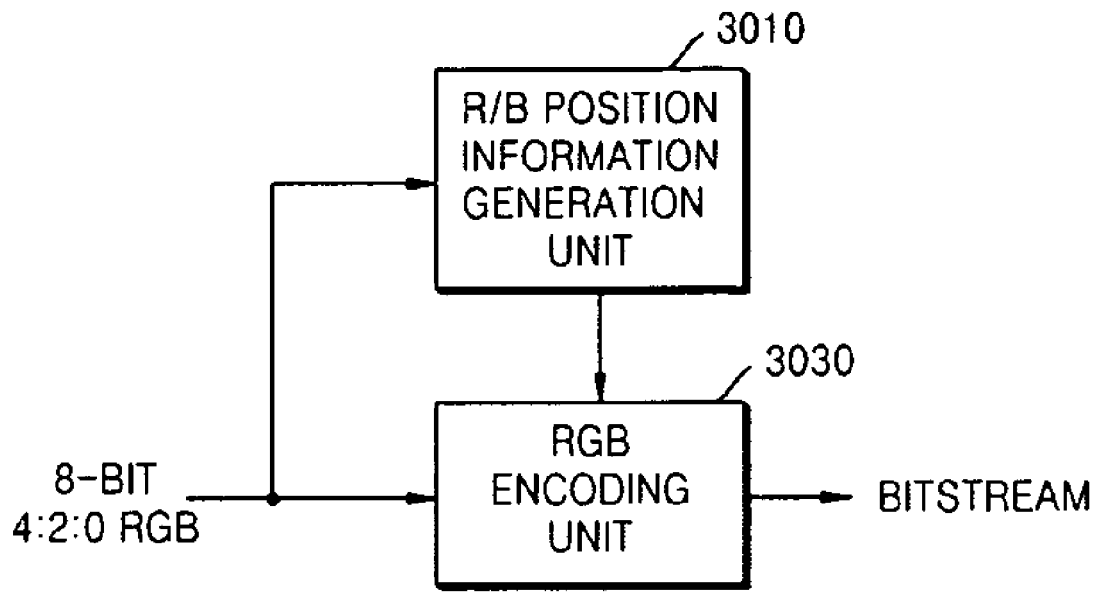
FIG. 30 illustrates an encoding unit, such as that illustrated in FIG. 3, according to another embodiment of the present invention.

FIG. 30 illustrates an encoding unit 330, such as illustrated in FIG. 3, according to still another embodiment of the present invention. Here, the encoding unit 330 of FIG. 30 may include an R/B position information generation unit 3010 and an RGB encoding unit 3030. In the encoding unit 330 of FIG. 30, elements related to sampling, and interpolation of a G component, and encoding of a G residue may be omitted. Except for this, the structure and operation of the encoding unit 330 of FIG. 30 may be similar to those of the encoding unit 2130, as illustrated in FIG. 22.

Accordingly, further detailed explanation of the operation of the encoding unit 330 of FIG. 30 will be omitted here.

Figure 31:
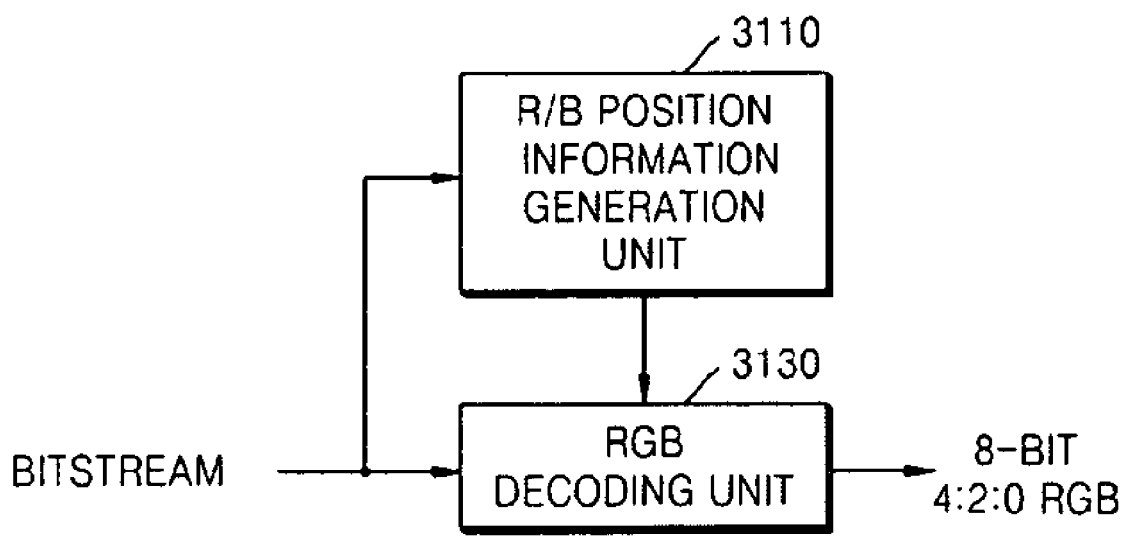
FIG. 31 illustrates a decoding unit, such as that illustrated in FIG. 3, according to another embodiment of the present invention.

FIG. 31 illustrates a decoding unit 370, such as illustrated in FIG. 3, according to still another embodiment of the present invention.

The decoding unit 370 of FIG. 31 may include an R/B position information generation unit 3110 and an RGB decoding unit 3130, for example. In the decoding unit 370 of FIG. 31, elements related to sampling and interpolation of a G component, and decoding of a G residue may be omitted. Except for this, the structure and operation of the decoding unit 370 of FIG. 31 may be the same as those of the decoding unit 2170, as illustrated in FIG. 23. Accordingly, further detailed explanation of the operation of the decoding unit 370 of FIG. 31 will be omitted here.

In embodiments of the present invention described above, an 8-bit 4:2:0 format RGB image or an 8-bit Bayer format RGB image were used only as examples. The present invention is not limited to these examples, and can be applied to a variety of images having differing numbers of bits, such as a 10-bit 4:2:0 format RGB image, a 10-bit Bayer format RGB image, a 12-bit 4:2:0 format RGB image or a 12-bit Bayer format RGB image, for example. In addition, image formats are not limited to the referenced 4:2:0 format RGB image, as a variety of image formats may be employed.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs)for example. The media may also be a distributed network, so that the computer readable code is stored/transferred and executed in a distributed fashion.

According to embodiments of the present invention, a sensor image obtained from a mobile device, for example, such as a digital camera, can be efficiently encoded and/or decoded in with higher compression ratios, without degradation of the picture quality of restored images or the encoding efficiency, even without converting the sensor image into a separate 4:2:0 format YUV image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sensor image encoding system, comprising:
a first color component interpolation unit including at least one processing device to transform a sensor image having at least first and second color components into a first format image by interpolating the first color component;
an output unit to encode the first format image based on the interpolated first color component and the second color component; and
a residue encoding unit to predictively encode a residue of the first color component,
wherein the interpolated first color component is interpolated to have a different resolution than the second color component to generate the residue of the first color component.

2. The system of claim 1, wherein the output unit is an encoding unit that generates a bitstream by the encoding of the first format image.

3. The system of claim 2, wherein the encoding unit comprises:

a color component sampling unit to sample the interpolated first color component such that a resultant sampled first color component and the second color component have identical resolutions; and a color component encoding unit to generate the bitstream by encoding the second color component and the sampled first color component.

4. The system of claim 3, wherein the color component encoding unit performs one of residue color transform and inter plane prediction (IPP) in order to remove redundancy between residue data of the sampled first color component and the second color component.

5. The system of claim 3, wherein the encoding unit further comprises:

a second color component interpolation unit to interpolate a decoding of an encoding of the sampled first color component, such that a resultant secondly interpolated first color component has a resolution identical to a resolution of the interpolated first color component; and the residue encoding unit to encode the residue of the first component between the interpolated first color component of the first format image and the secondly interpolated first component and to add the encoded residue component to the bitstream.

6. The system of claim 2, further comprising a position information generation unit to generate position information of the second color component in the sensor image, wherein the encoding unit generates the bitstream by encoding the sampled first color component and the second color component by using the position information.

7. The system of claim 6, wherein the position information generation unit generates the position information of the second color component based on motion information of the sampled first color component and relative position information of the second color component with respect to the sampled first color component.

8. The system of claim 6, wherein the encoding unit encodes the residue of the first color component between the interpolated first color component and a restored first component, restored and interpolated from the bitstream corresponding to the sampled first component, and adds the encoded residue component to the bitstream.

9. The system of claim 1, wherein the first format image is a 4:2:0 format RGB image.

10. The system of claim 1, where the sensor image has a predetermined pattern such that one pixel of the sensor image represents only a single color component and another pixel of the sensor image represents only another single color component.

11. A sensor image encoding system, comprising:

a first color component interpolation unit including at least one processing device to transform a sensor image into a first format image by interpolating a first color component of at least two color components in the sensor image, including the at least two color components, wherein one pixel of the sensor image represents only a single color component;

an output unit to output the first format image; and a residue encoding unit to predictively encode a residue of the first color component, wherein the first format image is a 4:2:0 format RGB image.

12. A sensor image encoding system, comprising:

a first color component interpolation unit including at least one processing device to transform a sensor image into a first format image by interpolating a first color component of at least two color components in the sensor image, including the at least two color components, wherein one pixel of the sensor image represents only a single color component; and an output unit to output the first format image, wherein the output unit is an encoding unit that generates a bitstream by encoding the first format image, wherein the encoding unit comprises:

a color component sampling unit to sample the first color component of the first format image such that a resultant sampled first color component and at least one of the at least two color components have identical resolutions; and a color component encoding unit to generate the bitstream by encoding the at least one of the at least two color components and the sampled first color component, and wherein the encoding unit further comprises:

a second color component interpolation unit to interpolate an encoded first color component, encoded in the color component encoding unit, such that a resultant secondly interpolated first color component has a resolution identical to a resolution of the first color component in the sensor image; and a residue encoding unit to encode a residue component between the first color component of the first format image and the secondly interpolated first component, as provided by the second color component interpolation unit, and to add the encoded residue component to the bitstream.

13. A sensor image decoding system to decode an encoded sensor image of a sensor image including at least first and second color components, the system comprising:

a decoding unit including at least one processing device for restoring and outputting a first format image from the encoded sensor image, the encoded sensor image having an interpolated first color component and a second color component, with a resultant first component of the first format image having a different resolution than the second color component of the encoded sensor image and the interpolated first color component and the second color component of the encoded sensor image having identical resolutions, such that the restored first format image includes the resultant first color component and the second color component of the encoded sensor image; and a first color component interpolation unit to interpolate the second color component of the restored first format image and output a resultant restored sensor image including the resultant first color component of the first format image and the interpolated second color component.

14. The system of claim 13, wherein the restored first format image is a 4:2:0 format RGB image.

15. The system of claim 13, wherein the decoding unit decodes the encoded sensor image from a received bitstream.

16. The system of claim 15 further comprising a position information generation unit to generate position information of the second color component of the bitstream, wherein the decoding unit and the first color component interpolation unit use the position information.

17. The system of claim 16, wherein the position information generation unit generates the position information of the second color component based on motion information of a first color component and relative position information of the second color component with respect to the first color component.

18. The system of claim 15, wherein the decoding unit comprises:

a color component decoding unit to generate the restored first format image by restoring at least two color components of the encoded sensor image by decoding the bitstream; and a second color component interpolation unit to interpolate the first color component of the encoded sensor image.

19. The system of claim 18, wherein the decoding unit further comprises:
a residue decoding unit to restore a residue component of the first color component of the restored sensor image by decoding the bitstream; and
an addition unit to add the interpolated first color component, as provided by the second color component interpolation unit, and the restored residue component.

20. The system of claim 18, wherein the color component decoding unit decodes the at least two color components by using one of residue color transform and inter plane prediction (IPP).

21. The system of claim 13, where the sensor image has a predetermined pattern such that one pixel of the sensor image represents only a single color component and another pixel of the sensor image represents only another single color component.

22. A sensor image encoding system, comprising:
an image input unit to input a sensor image having a predetermined pattern such that one pixel of the sensor image represents only a single color component and another pixel of the sensor image represents only another single color component; and
an encoding unit including at least one processing device to- encode the sensor image by removing redundancy of each color component existing in the pattern in the sensor image through color space transform, including generating a residue of one of the color components and predictively encoding the residue of the one color component.

23. The system of claim 22, wherein the encoding unit generates a bitstream by the encoding of the sensor image.

24. The system of claim 22, wherein the pattern is a repetitive pattern having an N×N size representing 4 color components of R, a first G, a second G, and B components.

25. The system of claim 24, wherein the encoding unit performs encoding by arraying color space transformed data as a color plane with respect to the 4 color components.

26. The system of claim 22, wherein, when it is determined that the pattern has a shape different from an N×N size, the sensor image is treated as a luminance image and encoded.

27. The system of claim 22, further comprising a color pattern information generation unit to generate color pattern information of at least two color components of the sensor image, wherein the encoding unit uses the color pattern information.

28. A sensor image decoding system to decode an encoded sensor image, where the sensor image has a predetermined pattern such that one pixel of the sensor image represents only a single color component and another pixel of the sensor image represents only another single color component, the decoding system comprising:
a decoding unit including at least one processing device to restore the encoded sensor image, as a restored sensor image, by decoding the encoded sensor image through inverse color space transform and a restored residue of one of the color components, with the decoding unit restoring a predictively encoded residue of the one color component to generate the restored residue; and a color component interpolation unit to interpolate a corresponding color component absent in each pixel in the restored sensor image.

29. The system of claim 28, wherein the decoding unit receives a bitstream comprising the encoded sensor image and the encoded sensor image is decoded by decoding the bitstream through the inverse color space transform.

30. The system of claim 29, further comprising a color pattern information generation unit to generate color pattern information of at least two color components of the encoded sensor image by decoding the bitstream, wherein the decoding unit and the color component interpolation unit use the color pattern information.

31. The system of claim 28, wherein the pattern is a repetitive pattern having an N×N size representing 4 color components of R, a first G, a second G, and B components.

32. The system of claim 31, wherein the decoding unit performs decoding by arraying inverse color space transformed data as a color plane with respect to the 4 color components.

33. The system of claim 31, wherein, when the pattern is determined to have a shape different from an N×N size, the encoded sensor image is treated as a luminance image and decoded.

34. A sensor image encoding method, comprising:
using at least one processing device transforming a sensor image having at least first and second color components into a first format image by interpolating the first color component;
outputting an encoding of the first format image based on the interpolated first color component and the second color component; and
predictively encoding a residue of the first color component,
wherein the interpolated first color component is interpolated to have a different resolution than the second color component.

35. The method of claim 34, wherein the first format image is a 4:2:0 format RGB image.

36. At least one computer readable medium comprising computer readable code to control at least one processing device to implement the sensor image encoding method of claim 34.

37. The method of claim 34, where the sensor image has a predetermined pattern such that one pixel of the sensor image represents only a single color component and another pixel of the sensor image represents only another single color component.

38. The method of claim 34, further comprising encoding a bitstream by the encoding of the first format image.

39. The method of claim 38, wherein the generating of the bitstream comprises:
sampling the interpolated first color component such that a resultant sampled first color component and the second color component have identical resolutions; and
generating the bitstream by encoding the second color component and the sampled first color component.

40. The method of claim 39, wherein the encoding unit further comprises:
a second color component interpolation unit to interpolate a decoding of an encoding of the sampled first color component, such that a resultant secondly interpolated first color component has a resolution identical to a resolution of the interpolated first color component; and
the residue encoding unit to encode the residue of the first component between the interpolated first color component of the first format image and the secondly interpolated first component and to add the encoded residue component to the bitstream.

41. The method of claim 39, wherein the generating of the bitstream further comprises:
encoding a residue component between the interpolated first color component and a restored first component, restored and interpolated from the bitstream corresponding to the sampled first component, and adding the encoded residue component to the bitstream.

42. The method of claim 41, wherein the residue is encoded sequentially by a space transform process, a quantization process, and an entropy encoding process on the residue.

43. The method of claim 39, further comprising generating position information of the second color component in the sensor image, wherein the bitstream is generated by encoding the sampled first color component and the second color component by using the position information.

44. A sensor image encoding method, comprising:
Including at least one processing device transforming a sensor image into a first format image by interpolating a first color component of at least two color components in the sensor image, including the at least two color components, wherein one pixel of the sensor image represents only a single color component;
outputting the first format image; and
a residue encoding unit to predictively encode a residue of the first color component,
wherein the first format image is a 4:2:0 format RGB image.

45. A sensor image encoding method, comprising:
using at least one processing device transforming a sensor image having at least first and second color components into a first format image by interpolating the first color component;
outputting an encoding of the first format image based on the interpolated first color component and the second color component;
encoding a bitstream by the encoding of the first format image,
wherein the interpolated first color component is interpolated to have a different resolution than the second color component,
wherein the generating of the bitstream comprises:
sampling the interpolated first color component such that a resultant sampled first color component and the second color component have identical resolutions; and
generating the bitstream by encoding the second color component and the sampled first color component,
wherein the generating of the bitstream further comprises:
encoding a residue component between the interpolated first color component and a restored first component, restored and interpolated from the bitstream corresponding to the sampled first component, and adding the encoded residue component to the bitstream, and
wherein the residue is encoded sequentially by a spatiotemporal prediction process, a space transform process, a quantization process, and an entropy encoding process on the residue.

46. A sensor image decoding method decoding an encoded sensor image of a sensor image including first and second color components, the method comprising:
using at least one processing device restoring and outputting a first format image from the encoded sensor image, the encoded sensor image having an interpolated first color component and a second color component, with a resultant first component of the first format image having a different resolution than the second color component of the encoded sensor, image and the interpolated first color component and the second color component of the encoded sensor image having identical resolutions, such that the restored first format image includes the resultant first color component and the second color component of the encoded sensor image; and
interpolating the second color component of the restored first format image and outputting a resultant restored sensor image including the resultant first color component of the first format image and the interpolated second color component.

47. The method of claim 46, further comprising decoding the encoded sensor image from a received bitstream.

48. The method of claim 47, further comprising generating position information of the second one color component of the bitstream, wherein the bitstream is decoded by using the position information.

49. The method of claim 46, wherein the restored first format image is a 4:2:0 format RGB image.

50. At least one computer readable medium comprising computer readable code to control at least one processing device to implement the sensor image decoding method of claim 46.

51. The method of claim 46, where the sensor image has a predetermined pattern such that one pixel of the sensor image represents only a single color component and another pixel of the sensor image represents only another single color component.

52. A sensor image encoding method, comprising:
inputting a sensor image having a predetermined pattern such that one pixel of the sensor image represents only a single color component and another pixel of the sensor image represents only another single color component;
using at least one processing device encoding the sensor image by removing redundancy of each color component existing in the pattern in the sensor image through color space transform; and
predictively encoding a residue of one of the color components.

53. The method of claim 52, wherein the encoding of the sensor image further comprises generating a bitstream by the encoding of the sensor image.

54. The method of claim 52, wherein the pattern is a repetitive pattern having an N×N size representing 4 color components of R, a first G, a second G, and B components.

55. The method of claim 54, wherein encoding further comprises arraying color space transformed data as a color plane with respect to the 4 color components.

56. The method of claim 52, further comprising determining whether the pattern has a shape different from an N×N size, and treating the sensor image as a luminance image and encoding the luminance image when the determining indicates that the pattern is shaped different from the N×N size.

57. The method of claim 52, further comprising generating color pattern information of at least two color components of the sensor image, wherein the bitstream is generated based on the color pattern information.

58. At least one computer readable medium comprising computer readable code to control at least one processing device to implement the sensor image encoding method of claim 52.

59. A sensor image decoding system to decode an encoded sensor image, as encoded by the encoding method of claim 52, the decoding system comprising:
a decoding unit including at least one processing device to restore the encoded sensor image, as a restored sensor image, by decoding the encoded sensor image through inverse color space transform; and a color component interpolation unit to interpolate a color component absent in each pixel in the restored sensor image.

60. A sensor image decoding method decoding an encoded sensor image, where the sensor image has a predetermined pattern such that one pixel of the sensor image represents only a single color component and another pixel of the sensor image represents only another single color component, the decoding method comprising:

using at least one processing device restoring the encoded sensor image by decoding the encoded sensor image through inverse color space transform and a restored residue of one of the color components, including restoring a predictively encoded residue of the one color component to generate the restored residue; and interpolating a corresponding color component absent in each pixel in the restored sensor image.

61. The method of claim 60, further comprising:

receiving a bitstream comprising the encoded sensor image; and decoding the bitstream through the inverse color space transform to generate the restored sensor image.

62. The method of claim 61, further comprising generating color pattern information of at least two color components of the encoded sensor image by decoding the bitstream, wherein the bitstream is decoded based on the color pattern information.

63. The method of claim 60, wherein the pattern is a repetitive pattern having an N×N size representing 4 color components of R, a first G, a second G, and B components.

64. The method of claim 60, further comprising determining whether the pattern has a shape different from an N×N size, and treating the encoded sensor image as a luminance image and decoding the luminance image when the determining indicates that the pattern is shaped different from the N×N size.

65. The method of claim 63, wherein the encoded sensor image is decoded by arraying inverse color space transformed data as a color plane with respect to the 4 color components.

66. At least one computer readable medium comprising computer readable code to control at least one processing device to implement the sensor image decoding method of claim 60.

67. A sensor image decoding system to decode an encoded sensor image, as encoded by the encoding method of claim 34, with the sensor image including at least two color components, in which one pixel of the sensor image represents only a single color component, the decoding system comprising:

a decoding unit including at least one processing device to restore a first format image of the encoded sensor image based on at least two color components obtained with the encoded sensor image; and a first color component interpolation unit to interpolate at least one color component in the first format image.

* * * * *

UNITED STATES PATENT AND TRADEMARK OFFICE
CERTIFICATE OF CORRECTION

PATENT NO. : 7,903,306 B2
APPLICATION NO. : 11/490020
DATED : March 8, 2011
INVENTOR(S) : Daesung Cho et al.

Page 1 of 1

It is certified that error appears in the above-identified patent and that said Letters Patent is hereby corrected as shown below:

Column 27, Line 19 in Claim 44, delete "Including" and insert -- including --, therefor.

Column 28, Line 1 in Claim 46, delete "sensor," and insert -- sensor --, therefor.

Column 28, Line 16 in Claim 48, after "second" delete "one".

Signed and Sealed this
Thirty-first Day of May, 2011

David J. Kappos
*Director of the United States Patent and Trademark Office*